(12) United States Patent
Wang et al.

(10) Patent No.: US 11,088,794 B2
(45) Date of Patent: Aug. 10, 2021

(54) DYNAMIC TIME ASSIGNMENT METHOD, APPARATUS, AND SYSTEM

(71) Applicant: Huawei Technologies Co., Ltd., Shenzhen (CN)

(72) Inventors: Weiyang Wang, Shenzhen (CN); Xiang Wang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 83 days.

(21) Appl. No.: 16/698,150

(22) Filed: Nov. 27, 2019

(65) Prior Publication Data

US 2020/0119873 A1 Apr. 16, 2020

Related U.S. Application Data

(63) Continuation of application No. PCT/CN2017/087083, filed on Jun. 2, 2017.

(51) Int. Cl.
*H04L 5/00* (2006.01)

(52) U.S. Cl.
CPC .......... *H04L 5/0046* (2013.01); *H04L 5/0096* (2013.01)

(58) Field of Classification Search
CPC ............................. H04L 5/0046; H04L 5/0096
USPC ......................................................... 375/219
See application file for complete search history.

(56) References Cited

U.S. PATENT DOCUMENTS

| | | | |
|---|---|---|---|
| 2005/0259629 A1* | 11/2005 | Oliver | H04B 7/2659 370/345 |
| 2016/0191230 A1 | 6/2016 | Shi et al. | |
| 2018/0013536 A1* | 1/2018 | Minn | H04B 7/0413 |

FOREIGN PATENT DOCUMENTS

| | | |
|---|---|---|
| CN | 102045103 A | 5/2011 |
| CN | 103108355 A | 5/2013 |
| CN | 103516490 A | 1/2014 |
| CN | 104350685 A | 2/2015 |

OTHER PUBLICATIONS

ITU-T Telecommunications Standardization Sector of ITU, "Fast Access to Subscriber Terminals (G.fast)—Physical layer specification", Series G: Transmission Systems, and Media Digital Systems and Networks—Access networks—Metallic access networks, G.9701 Amendment 3, Apr. 2017, pp. 1-450, XP044263039.

(Continued)

*Primary Examiner* — Kevin M Burd
(74) *Attorney, Agent, or Firm* — Slater Matsil, LLP

(57) ABSTRACT

This application provides a dynamic time assignment method, apparatus, and system, and relates to the field of communications technologies. The method includes: Central office equipment and customer premise equipment obtain a length of a new downstream transmission duration. The central office equipment and the customer premise equipment first shorten a downstream transmission duration or an upstream transmission duration whose length needs to be shortened; and after lengths of all downstream transmission durations or all upstream transmission durations are shortened, prolong the length of the downstream transmission duration or the upstream transmission duration whose length needs to be prolonged.

20 Claims, 11 Drawing Sheets

(56) References Cited

OTHER PUBLICATIONS

Adtran et al., "G.fast: Proposal for a cDTA Framework", Q4/15-C12,Study Group 15, Telecommunication Standardization Sector, Study Period 2017-2020, Apr. 3-7, 2017, pp. 1-3, XP044213005.
Adtran et al., "G.fast: cDTA from a service perspective", Temporary Document 2017-02-Q4-068, ITU—Telecommunication Standardization Sector, Feb. 6-10, 2017, pp. 1-6, XP044204436.
International Telecommunication Union, "Series G: Transmission Systems and Media, Digital Systems and Networks Access networks—Metallic access networks—Fast Access to Subscriber Terminals (FAST)—Physical layer specification," ITU-T G.9701, Dec. 2014, 340 pages.

* cited by examiner

US 11,088,794 B2

DYNAMIC TIME ASSIGNMENT METHOD, APPARATUS, AND SYSTEM

CROSS-REFERENCE TO RELATED APPLICATIONS

This application is a continuation of International Application No. PCT/CN2017/087083, filed on Jun. 2, 2017, the disclosure of which is hereby incorporated by reference in its entirety.

TECHNICAL FIELD

This application relates to the field of network communications, and in particular, to a dynamic time assignment method, apparatus, and system.

BACKGROUND

Fiber to the distribution point (FTTdp) is a network communication solution using hybrid optical fibers/copper wires. In an FTTdp access scenario, an operator network is connected to a distribution point (dp) by using an optical fiber. At the distribution point, one FTTdp central office (CO) equipment changes the optical fiber to a twisted pair, and then the FITdp CO equipment is connected to FITdp customer premise equipment (CPE) by using the twisted pair as a transmission medium.

A digital subscriber line (DSL) technology is used as a manner of data transmission between conventional FITdp CO equipment and conventional FTdp CPE. However, with development of copper broadband access technologies, the manner of data transmission between the FTdp CO equipment and the FTTdp CPE has been updated to a next-generation broadband access technology G.fast. In the G.fast technology, a time division duplex (TDD) mode is used. To be specific, some symbols in a TDD frame are used as downstream symbols for downstream data transmission, and the other symbols are used as upstream symbols for upstream data transmission.

For the TDD mode, a dynamic time assignment (DTA) mechanism can allocate proper length of an upstream transmission duration or a downstream transmission duration (symbols used for upstream or downstream data transmission) based on an upstream traffic change or a downstream traffic change.

In a process of implementing this application, the inventor finds that the prior art has at least the following problem:

The FTTdp CO equipment simultaneously accesses a plurality of signals. For the plurality of signals accessed by the FTTdp CO equipment, during dynamic time assignment, lengths of an upstream transmission duration or a downstream transmission duration in a same FTdp CO frame need to be configured for each signal, otherwise upstream and downstream time of different signals are asynchronous. Consequently, near-end crosstalk and unstable statuses such as a bit error and disconnection are caused, affecting normal signal transmission.

SUMMARY

To overcome near-end crosstalk caused by asynchronous upstream and downstream time in a multi-port scenario of FTdp CO equipment, this application provides a dynamic time assignment method, apparatus, and system. The technical solutions are as follows.

According to a first aspect, a dynamic time assignment method is provided. The method is executed by central office equipment, and the central office equipment includes at least two transceivers. The dynamic time assignment method includes: obtaining, by the central office equipment, a length of a new downstream transmission duration; and when the length of the new downstream transmission duration is less than lengths of current downstream transmission durations of the at least two transceivers of the central office equipment, adjusting, by the central office equipment, lengths of current upstream transmission durations of the at least two transceivers to a length of a new upstream transmission duration after shortening the lengths of the current downstream transmission durations of the at least two transceivers to the length of the new downstream transmission duration; or when the length of the new downstream transmission duration is greater than lengths of current downstream transmission durations of the at least two transceivers, adjusting, by the central office equipment, the lengths of the current downstream transmission durations of the at least two transceivers to the length of the new downstream transmission duration after shortening lengths of current upstream transmission durations of the at least two transceivers to a length of a new upstream transmission duration. A sum of the length of the new upstream transmission duration and the length of the new downstream transmission duration is equal to a length obtained by subtracting upstream and downstream switching duration from one transmission frame.

In this method, after the central office equipment obtains the length of the new downstream transmission duration, the central office equipment first shortens a downstream transmission duration or an upstream transmission duration whose length needs to be shortened; and after lengths of all downstream transmission durations or all upstream transmission durations are shortened, prolongs the downstream transmission duration or the upstream transmission duration whose length needs to be prolonged. The time assignment solution is divided into two phases in the foregoing manner. The length of the downstream transmission duration or the length of the upstream transmission duration is shortened in the first phase. In this process, even though lengths of downstream transmission durations corresponding to some signals or lengths of upstream transmission durations corresponding to some signals are not shortened in time, near-end crosstalk does not occur because other signals do not transmit reverse signals in a time interval obtained through shortening. In the second phase, after lengths of downstream transmission durations corresponding to all signals or lengths of upstream transmission durations corresponding to all signals are shortened, the length of the upstream transmission duration or the length of the downstream transmission duration is prolonged to complete upstream or downstream time assignment. Similarly, near-end crosstalk does not occur in the second phase. Therefore, the method provided in this embodiment of the present invention can complete upstream or downstream time assignment of a plurality of signals without near-end crosstalk.

A length of an upstream transmission duration of a transceiver is a length of a time period during which the transceiver transmits upstream data in a frame, and a length of a downstream transmission duration of the transceiver is a length of a time point during which the transceiver transmits downstream data in a frame.

With reference to the first aspect, in a first implementation of the first aspect, the dynamic time assignment method further includes: after the central office equipment obtains the length of the new downstream transmission duration, sending, by the central office equipment, a first instruction message to customer premise equipment, where the first instruction message includes the length of the new downstream transmission duration; and after the lengths of the downstream transmission durations of the at least two transceivers of the central office equipment have been shortened to the length of the new downstream transmission duration, or after lengths of upstream transmission durations of transceivers of at least two customer premise equipments have been shortened to the length of the new upstream transmission duration, sending, by the central office equipment, a second instruction message to the customer premise equipment, where the second instruction message is used to instruct the customer premise equipment to respectively adjust a length parameter of an upstream transmission duration and/or a length parameter of a downstream transmission duration of a transceiver of the customer premise equipment to a length of an upstream transmission duration and a length of a downstream transmission duration that are determined based on the length of the downstream transmission duration in the first instruction message, and the transceivers of the at least two customer premise equipments and the at least two transceivers of the central office equipment are disposed correspondingly.

In this implementation, the central office equipment sends the first instruction message to the customer premise equipment, to notify an adjusted length and/or adjusted lengths of the upstream transmission duration and/or downstream transmission duration, so that the customer premise equipment can perform adjustment based on the length and/or lengths. The central office equipment sends the second instruction message to the customer premise equipment, to implement the following functions: When the length of the new downstream transmission duration is less than the lengths of the current downstream transmission durations of the at least two transceivers of the central office equipment, the central office equipment first shortens the length of the downstream transmission duration, and before all transceivers of the central office equipment shorten all lengths of downstream transmission durations, the customer premise equipment cannot prolong a length of an upstream transmission duration (which may cause upstream and downstream asynchronization). Therefore, the central office equipment needs to send the second instruction message for indication, so that the customer premise equipment can prolong the length of the upstream transmission duration. When the length of the new downstream transmission duration is greater than the lengths of the current downstream transmission durations of the at least two transceivers, the customer premise equipment first shortens a length of an upstream transmission duration, and after all customer premise equipments shorten lengths of upstream transmission durations, the customer premise equipment starts to prolong a length of a downstream transmission duration. However, because the customer premise equipments are discrete from each other, one customer premise equipment cannot determine whether all the customer premise equipments have shortened the lengths of the upstream transmission durations. Therefore, the central office equipment needs to perform indication by using the second instruction message.

With reference to the first implementation of the first aspect, in a second implementation of the first aspect, the sending, by the central office equipment, a first instruction message to customer premise equipment includes: sending, by the central office equipment, the first instruction message by using a downstream robustness management channel RMC symbol; and the sending, by the central office equipment, a second instruction message to the customer premise equipment includes: sending, by the central office equipment, the second instruction message by using an RMC symbol.

In this implementation, the first instruction message and the second instruction message are sent by using the RMC symbols, to be specific, by using DTA messages in the RMC symbols. It is easy and convenient to send the first instruction message and the second instruction message by using the DTA messages.

With reference to the first implementation of the first aspect or the second implementation of the first aspect, in a third implementation of the first aspect, the method further includes: determining, by the central office equipment, whether the lengths of the upstream transmission durations of the transceivers of the at least two customer premise equipments have been shortened to the length of the new upstream transmission duration.

Because the second message is sent after the lengths of the downstream transmission durations of the at least two transceivers of the central office equipment have been shortened to the length of the new downstream transmission duration or the lengths of the upstream transmission durations of the transceivers of the at least two customer premise equipments have been shortened to the length of the new upstream transmission duration, the central office equipment needs to first determine whether the lengths of the upstream transmission durations of the transceivers of the at least two customer premise equipments have been shortened to the length of the new upstream transmission duration.

With reference to the third implementation of the first aspect, in a fourth implementation of the first aspect, the determining, by the central office equipment, whether the lengths of the upstream transmission durations of the transceivers of the at least two customer premise equipments have been shortened to the length of the new upstream transmission duration includes: receiving, by the central office equipment, third instruction messages sent by transceivers of at least two customer premise equipments, where the third instruction messages are used to indicate time points that are determined by the customer premise equipments and at which the transceivers of the customer premise equipments shorten the lengths of the upstream transmission durations to the length of the new upstream transmission duration; determining, by the central office equipment based on the third instruction message, a time point at which the transceivers of the at least two customer premise equipments shorten the lengths of the upstream transmission durations to the length of the new upstream transmission duration; and determining, by the central office equipment based on the time point at which the transceivers of the at least two customer premise equipments shorten the lengths of the upstream transmission durations to the length of the new upstream transmission duration, whether the lengths of the upstream transmission durations of the transceivers of the at least two customer premise equipments have been shortened to the length of the new upstream transmission duration.

In this implementation, the time point at which the transceiver of the customer premise equipment shortens the length of the upstream transmission duration is determined by receiving the third instruction message sent by the transceiver of the customer premise equipment, to determine whether the lengths of the upstream transmission durations of the transceivers of the at least two customer premise equipments have been shortened to the length of the new upstream transmission duration.

With reference to the third implementation of the first aspect, in a fifth implementation of the first aspect, the determining, by the central office equipment, whether the lengths of the upstream transmission durations of the transceivers of the at least two customer premise equipments have been shortened to the length of the new upstream transmission duration includes: detecting, by the central office equipment frame by frame, positions of upstream RMC symbols corresponding to the transceivers of the at least two customer premise equipments, where when it is detected that a position of an upstream RMC symbol corresponding to a transceiver of first customer premise equipment is delayed, relative to a first position, by a quantity of symbols by which the new downstream transmission duration is to be increased, a length of an upstream transmission duration corresponding to the transceiver of the first customer premise equipment has been shortened to the length of the new upstream transmission duration; the first position is the position of the upstream RMC symbol before a time point at which the length of the upstream transmission duration is shortened to the length of the new upstream transmission duration; and the at least two customer premise equipments include the first user equipment; and determining, by the central office equipment based on detected positions of upstream RMC symbols corresponding to the transceivers of the at least two customer premise equipments, whether the lengths of the upstream transmission durations of the transceivers of the at least two customer premise equipments have been shortened to the length of the new upstream transmission duration.

In this implementation, a position of an upstream RMC symbol is detected to determine a time point at which a transceiver of customer premise equipment shortens a length of an upstream transmission duration, thereby determining whether lengths of upstream transmission durations of the transceivers of the at least two customer premise equipments have been shortened to the length of the new upstream transmission duration. The position of the upstream RMC symbol is a position of the upstream RMC symbol in the TDD frame.

With reference to any one of the first aspect or the first implementation to the fifth implementation of the first aspect, in a sixth implementation of the first aspect, when the length of the new downstream transmission duration is less than the lengths of the current downstream transmission durations of the at least two transceivers of the central office equipment, the dynamic time assignment method further includes: before the lengths of the downstream transmission durations of the at least two transceivers of the central office equipment have been shortened to the length of the new downstream transmission duration, processing, by the central office equipment, the $(Mds\_New+1)^{th}$ to the $(Mds\_Old)^{th}$ symbols in the downstream transmission durations by using a downstream precoding technology. For a signal for which a length of a downstream transmission duration has been shortened, an idle symbol is transmitted in the $(Mds\_New+1)^{th}$ to the $(Mds\_Old)^{th}$ symbols in the downstream transmission duration, Mds_New is a quantity of symbols in the new downstream transmission duration, and Mds_Old is a quantity of symbols in the current downstream transmission duration.

In this implementation, when the length of the downstream transmission duration is shortened to the length of the new downstream transmission duration, a downstream precoding technology is used to perform processing for a time interval obtained through shortening, to avoid far-end crosstalk.

With reference to any one of the first aspect or the first implementation to the fifth implementation of the first aspect, in a seventh implementation of the first aspect, when the length of the new downstream transmission duration is greater than the lengths of the current downstream transmission durations of the at least two transceivers of the central office equipment, the dynamic time assignment method further includes: before the lengths of the upstream transmission durations of the transceivers of the at least two customer premise equipments have been shortened to the length of the new upstream transmission duration, processing, by the central office equipment, the $1^{st}$ to the $(Mds\_New-Mds\_Old)^{th}$ symbols in the upstream transmission durations by using an upstream joint reception technology. Mds_New is a quantity of symbols in the new downstream transmission duration, and Mds_Old is a quantity of symbols in the current downstream transmission duration.

In this implementation, when the length of the upstream transmission duration is shortened to the length of the new upstream transmission duration, an upstream joint reception technology is used to perform processing for a time interval obtained through shortening, to avoid far-end crosstalk.

With reference to any one of the first implementation to the seventh implementation of the first aspect, in an eighth implementation of the first aspect, when the length of the new downstream transmission duration is less than the lengths of the current downstream transmission durations of the at least two transceivers of the central office equipment, the dynamic time assignment method further includes: after the central office equipment sends the second instruction message to the customer premise equipment, processing, by the central office equipment, the $1^{st}$ to the $(Mds\_Old-Mds\_New)^{th}$ symbols in the upstream transmission durations by using an upstream joint reception technology. Mds_New is a quantity of symbols in the new downstream transmission duration, and Mds_Old is a quantity of symbols in the current downstream transmission duration.

In this implementation, in a process of adjusting a length of an upstream transmission duration to the length of the new upstream transmission duration, an upstream joint reception technology is used to process a symbol in the upstream transmission duration, to avoid the far-end crosstalk.

With reference to any one of the first implementation to the seventh implementation of the first aspect, in a ninth implementation of the first aspect, when the length of the new downstream transmission duration is greater than the lengths of the current downstream transmission durations of the at least two transceivers of the central office equipment, the dynamic time assignment method further includes: after the central office equipment sends the second instruction message to the customer premise equipment, processing, by the central office equipment, the $(Mds\_Old+1)^{th}$ to the $(Mds\_New)^{th}$ symbols in the downstream transmission durations by using a downstream precoding technology. For a signal for which a length of a downstream transmission duration has been adjusted, an idle symbol is transmitted in the $(Mds\_Old+1)^{th}$ to the $(Mds\_New)^{th}$ symbols in the downstream transmission duration, Mds_New is a quantity of symbols in the new downstream transmission duration, and Mds_Old is a quantity of symbols in the current downstream transmission duration.

In this implementation, in a process of adjusting a length of a downstream transmission duration to the length of the new downstream transmission duration, a downstream precoding technology is used to process a symbol in the downstream transmission duration, to avoid far-end crosstalk.

According to a second aspect, a dynamic time assignment method is provided. The method is executed by central office equipment, and the central office equipment includes at least two transceivers. The dynamic time assignment method includes: obtaining, by the central office equipment, a length of a new upstream transmission duration; and when a length of a new downstream transmission duration is less than lengths of current downstream transmission durations of the at least two transceivers of the central office equipment, adjusting, by the central office equipment, lengths of current upstream transmission durations of the at least two transceivers to the length of the new upstream transmission duration after shortening the lengths of the current downstream transmission durations of the at least two transceivers to the length of the new downstream transmission duration; or when a length of a new downstream transmission duration is greater than lengths of current downstream transmission durations of the at least two transceivers, adjusting, by the central office equipment, the lengths of the current downstream transmission durations of the at least two transceivers to the length of the new downstream transmission duration after shortening lengths of current upstream transmission durations of the at least two transceivers to a length of a new upstream transmission duration; where a sum of the length of the new upstream transmission duration and the length of the new downstream transmission duration is equal to a length obtained by subtracting upstream and downstream switching duration from one transmission frame.

A difference between the second aspect and the first aspect lies in that the central office equipment obtains the length of the new upstream transmission duration. Because the sum of the length of the upstream transmission duration and the length of the downstream transmission duration is equal to a total length of one transmission frame minus upstream and downstream switching duration, the length of the new downstream transmission duration may be determined based on the length of the new upstream transmission duration.

According to a third aspect, a dynamic time assignment method is provided. The dynamic time assignment method includes: obtaining, by customer premise equipment, a length of a new downstream transmission duration; and when the length of the new downstream transmission duration is less than a length of a current downstream transmission duration of a transceiver of the customer premise equipment, adjusting, by the customer premise equipment, a length of a current upstream transmission duration of the transceiver of the customer premise equipment to a length of a new upstream transmission duration after shortening the length of the current downstream transmission duration of the transceiver of the customer premise equipment to the length of the new downstream transmission duration; or when the length of the new downstream transmission duration is greater than a length of a current downstream transmission duration of a transceiver of the customer premise equipment, adjusting, by the customer premise equipment, the length of the current downstream transmission duration of the transceiver of the customer premise equipment to the length of the new downstream transmission duration after shortening a length of a current upstream transmission duration of the transceiver of the customer premise equipment to a length of a new upstream transmission duration; where a sum of the length of the new upstream transmission duration and the length of the new downstream transmission duration is equal to a length obtained by subtracting upstream and downstream switching duration from one transmission frame.

In the method, after the customer premise equipment obtains the length of the new downstream transmission duration, the customer premise equipment first shortens a downstream transmission duration or an upstream transmission duration whose length needs to be shortened; and after lengths of all downstream transmission durations or all upstream transmission durations are shortened, prolongs the downstream transmission duration or the upstream transmission duration whose length needs to be prolonged. The time assignment solution is divided into two phases in the foregoing manner. The length of the downstream transmission duration or the length of the upstream transmission duration is shortened in the first phase. In this process, even though lengths of downstream transmission durations corresponding to some signals or lengths of upstream transmission durations corresponding to some signals are not shortened in time, near-end crosstalk does not occur because other signals do not transmit reverse signals in a time interval obtained through shortening. In the second phase, after lengths of downstream transmission durations corresponding to all signals or lengths of upstream transmission durations corresponding to all signals are shortened, the length of the upstream transmission duration or the length of the downstream transmission duration is prolonged to complete upstream or downstream time assignment. Similarly, near-end crosstalk does not occur in the second phase. Therefore, the method provided in this embodiment of the present invention can upstream or downstream time assignment of a plurality of signals without near-end crosstalk.

With reference to the third aspect, in a first implementation of the third aspect, the obtaining, by customer premise equipment, a length of a new downstream transmission duration includes: receiving, by the customer premise equipment, a first instruction message sent by central office equipment, where the first instruction message includes the length of the new downstream transmission duration; and the receiving a first instruction message sent by central office equipment includes: receiving, by the customer premise equipment, the first instruction message sent by the central office equipment by using a downstream RMC symbol.

With reference to the first implementation of the third aspect, in a second implementation of the third aspect, the method further includes: receiving, by the customer premise equipment, a second instruction message sent by the central office equipment, where the second instruction message is used to instruct the customer premise equipment to respectively adjust a length parameter of an upstream transmission duration and/or a length parameter of a downstream transmission duration of a transceiver of the customer premise equipment to a length of an upstream transmission duration and a length of a downstream transmission duration that are determined based on the length of the downstream transmission duration in the first instruction message, and the transceivers of the at least two customer premise equipments and the at least two transceivers of the central office equipment are disposed correspondingly; and the receiving a second instruction message sent by central office equipment includes: receiving, by the customer premise equipment, the second instruction message sent by the central office equipment by using a downstream RMC symbol.

With reference to the third aspect or the first implementation or the second implementation of the third aspect, in a third implementation of the third aspect, the dynamic time assignment method further includes: sending, by the customer premise equipment, a third instruction message to the central office equipment, where the third instruction message is used to indicate a time point that is determined by the customer premise equipment and at which the transceiver of the customer premise equipment shortens a length of an upstream transmission duration to the length of the new upstream transmission duration.

According to a fourth aspect, a dynamic time assignment method is provided. The dynamic time assignment method includes: obtaining, by customer premise equipment, a length of a new upstream transmission duration; and when a length of the new downstream transmission duration is less than a length of a current downstream transmission duration of a transceiver of the customer premise equipment, adjusting, by the customer premise equipment, a length of a current upstream transmission duration of the transceiver of the customer premise equipment to the length of the new upstream transmission duration after shortening the length of the current downstream transmission duration of the transceiver of the customer premise equipment to the length of the new downstream transmission duration; or when a length of a new downstream transmission duration is greater than a length of a current downstream transmission duration of a transceiver of the customer premise equipment, adjusting, by the customer premise equipment, the length of the current downstream transmission duration of the transceiver of the customer premise equipment to the length of the new downstream transmission duration after shortening a length of a current upstream transmission duration of the transceiver of the customer premise equipment to the length of the new upstream transmission duration. A sum of the length of the new upstream transmission duration and the length of the new downstream transmission duration is equal to a length obtained by subtracting upstream and downstream switching duration from one transmission frame.

A difference between the fourth aspect and the third aspect lies in that the customer premise equipment obtains the length of the new upstream transmission duration. Because the sum of the length of the upstream transmission duration and the length of the downstream transmission duration is equal to a total length of one transmission frame minus upstream and downstream switching duration, the length of the new downstream transmission duration may be determined based on the length of the new upstream transmission duration.

According to a fifth aspect, an embodiment of the present invention provides a dynamic time assignment apparatus. The dynamic time assignment apparatus includes units configured to implement the method provided in any one of the first aspect or the possible implementations of the third aspect, for example, an obtaining unit and an adjustment unit.

According to a sixth aspect, an embodiment of the present invention provides a dynamic time assignment apparatus. The dynamic time assignment apparatus includes units configured to implement the method provided in any one of the second aspect or the possible implementations of the fourth aspect, for example, an obtaining unit and an adjustment unit.

According to a seventh aspect, an embodiment of the present invention provides a dynamic time assignment apparatus. The apparatus includes a memory and a processor connected to the memory. The memory is configured to store a software program and a module, and when the processor is configured to run or execute the software program and the module that are stored in the memory, the processor may perform the method provided in any one of the first aspect or the possible implementations of the first aspect.

According to an eighth aspect, an embodiment of the present invention provides a dynamic time assignment apparatus. The apparatus includes a memory and a processor connected to the memory. The memory is configured to store a software program and a module, and when the processor is configured to run or execute the software program and the module that are stored in the memory, the processor may perform the method provided in any one of the second aspect or the possible implementations of the fourth aspect.

According to a ninth aspect, an embodiment of the present invention further provides a computer readable medium, configured to store program code executed by a dynamic time assignment apparatus. The program code includes an instruction for performing the method provided in any one of the first aspect or the possible implementations of the third aspect.

According to a tenth aspect, an embodiment of the present invention further provides a computer readable medium, configured to store program code executed by a dynamic time assignment apparatus. The program code includes an instruction for performing the method provided in any one of the second aspect or the possible implementations of the fourth aspect.

According to an eleventh aspect, an embodiment of the present invention further provides a communications chip, applied to a dynamic time assignment apparatus. The communications chip includes a processor, a memory, and a communications interface. The processor, the memory, and the communications interface are coupled by using buses, the memory is configured to store a program instruction, and the processor executes the program instruction stored in the memory, so that a communications system device loaded with the communications chip can perform the method according to any one of the first aspect or the possible implementations of the third aspect.

According to a twelfth aspect, an embodiment of the present invention further provides a communications chip, applied to a dynamic time assignment apparatus. The communications chip includes a processor, a memory, and a communications interface. The processor, the memory, and the communications interface are coupled by using buses, the memory is configured to store a program instruction, and the processor executes the program instruction stored in the memory, so that a communications system device loaded with the communications chip can perform the method provided in any one of the second aspect or the possible implementations of the fourth aspect.

According to a thirteenth aspect, an embodiment of the present invention further provides a dynamic time assignment system. The dynamic time assignment system includes central office equipment and customer premise equipment, and the central office equipment includes the dynamic time assignment apparatus provided in any possible implementation of the fifth aspect. The customer premise equipment includes the dynamic time assignment apparatus provided in any possible implementation of the sixth aspect.

DETAILED DESCRIPTION OF ILLUSTRATIVE EMBODIMENTS

To make the objectives, technical solutions, and advantages of this application clearer, the following further describes the implementations of this application in detail with reference to the accompanying drawings.

A "module" mentioned in this specification is a program or an instruction that is stored in a memory and that can implement some functions. A "unit" mentioned in this specification is a functional structure obtained through logical division. The "unit" may be implemented by hardware only or by a combination of software and hardware.

Figure 1A:
FIG. 1A is a diagram of an application scenario according to an embodiment of the present invention.

For ease of subsequent description, the following first describes an application scenario of the embodiments of the present invention with reference to FIG. 1A.

As shown in FIG. 1A, in an FTdp access scenario, an optical line terminal (OLT) 101 is connected to FTdp CO equipment 102 at a distribution point by using a passive optical network (PON), the FTdp CO equipment 102 changes an optical fiber to a twisted pair, and then the FITdp CO equipment 102 is connected to FITdp CPE 103 by using the twisted pair.

The FTTdp CO equipment (that is, central office equipment) and the FITdp CPE (that is, customer premise equipment) use a technology such as G.fast or a second generation very high speed digital subscriber line (VDSL2) for signal transmission. The following uses the G.fast as an example for description. When the G.fast technology is used, a plurality of signals are simultaneously accessed on the FTTdp CO equipment. Each signal is corresponding to one G.fast transceiver unit-CO side (FTU-O) and one G.fast transceiver unit-remote side (FTU-R). FTU-Os corresponding to the plurality of signals herein usually belong to one FTTdp CO equipment, and are in a one-to-one correspondence with a plurality of ports on the FITdp CO equipment. FTU-Rs corresponding to all the signals belong to one FTdp CPE.

Figure 2:
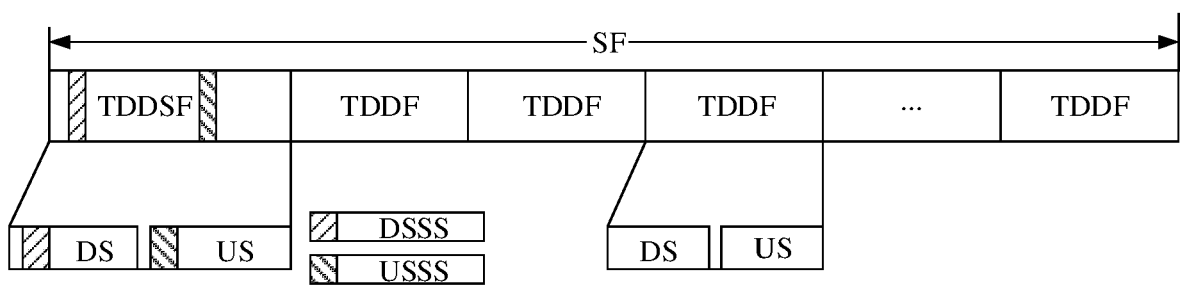
FIG. 2 is a schematic diagram of a frame format according to an embodiment of the present invention.

The G.fast technology uses a TDD mode. One of an FTU-O and an FTU-R (the FTU-O and the FTU-R that are connected by using a same twisted pair) that are corresponding to a same signal in a same timeslot is used for transmission, and the other one of the FTU-O and the FTU-R is used for reception. A frame format used by the G.fast is shown in FIG. 2. A superframe (SF) includes one TDD synchronization frame (TDDSF) and a plurality of TDD frames (TDDF). The TDD synchronization frame includes a downstream synchronization symbol (DSSS) and an upstream synchronization symbol (USSS). The TDD frame includes a downstream symbol (DS) and an upstream symbol (US). The downstream symbol is used to transmit downstream data (to be specific, the data is transmitted from a CO side to a remote side), and the upstream symbol is used to transmit upstream data (to be specific, the data is transmitted from a remote side to a CO side).

Figure 1B:
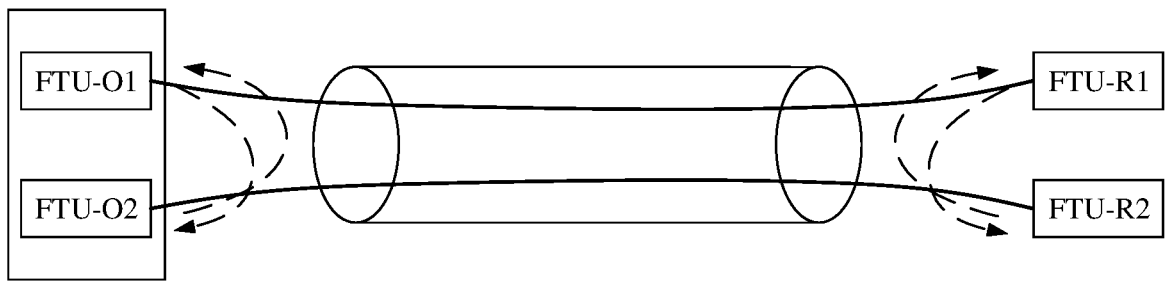
FIG. 1B is a schematic diagram of forming near-end crosstalk according to an embodiment of the present invention.

Crosstalk may occur between the plurality of signals accessed by the FTdp CO equipment, and the crosstalk includes near-end crosstalk and far-end crosstalk. The near-end crosstalk means that, for transceiver units located at a same end, if one transceiver unit works in a sending state, and the other transceiver unit works in a receiving state, the transceiver unit in the sending state causes interference to the transceiver unit that is in the receiving state. FIG. 1B is a schematic diagram of forming near-end crosstalk. An FTU-O 1 and an FTU-O 2 are used as an example. When the FTU-O 1 is in a sending state and the FTU-O 2 is in a receiving state, the FTU-O 1 causes interference to the FTU-O 2, forming near-end crosstalk. Dashed lines in FIG. 1B show four near-end crosstalk forming manners. Due to the foregoing reason for causing near-end crosstalk, the near-end crosstalk does not occur provided that upstream and downstream time synchronization of a plurality of signals is ensured (that is, the plurality of signals are simultaneously in a sending or receiving state).

Figure 1C:
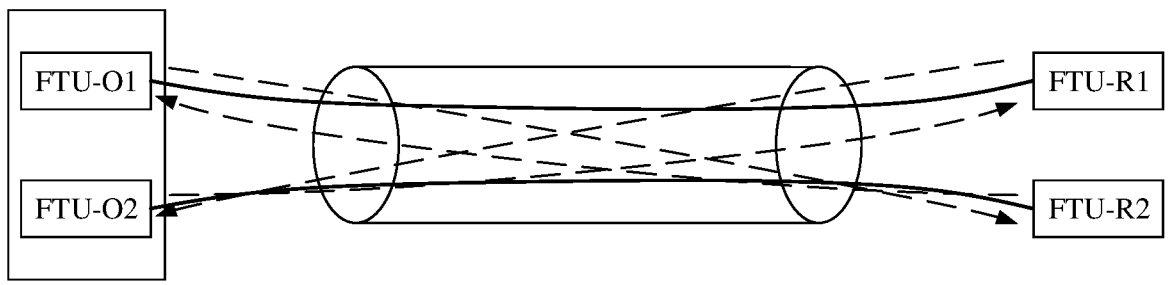
FIG. 1C is a schematic diagram of forming far-end crosstalk according to an embodiment of the present invention.

The far-end crosstalk means that interference is caused by a transceiver unit at one end that works in a sending state to a transceiver unit at another end that works in a receiving state (where the two transceiver units are corresponding to different signals). FIG. 1C is a schematic diagram of forming far-end crosstalk. An FTU-O 1 and an FTU-R 2 are used as an example. When the FTU-O 1 is in a sending state and the FTU-R 2 is in a receiving state, the FTU-O 1 causes interference to the FTU-R 2, forming far-end crosstalk. Dashed lines in FIG. 1C show four far-end crosstalk forming manners. The far-end crosstalk needs to be overcome by using a vectoring technology. Specifically, the vectoring technology is usually executed at the CO side (for example, the FITdp CO equipment), and includes two aspects: downstream precoding and upstream joint reception.

The downstream precoding technology is as follows: A remote side (for example, the FTdp CPE) feeds back far-end crosstalk information to a CO side, and the CO side obtains a "backward" crosstalk signal based on the far-end crosstalk information, and superimposes the "backward" crosstalk signal to a signal sent by the CO side, thereby implementing crosstalk cancellation. The downstream precoding technology mainly includes a linear precoding technology and a QR-Tomlinson-Harashima precoder (QRTHP) non-linear precoding technology. The upstream joint reception is as follows: A crosstalk canceller is disposed when a CO side receives a signal sent by a remote side, so that crosstalk in the signal is cancelled after the received signal passes through the crosstalk canceller.

Figure 3:
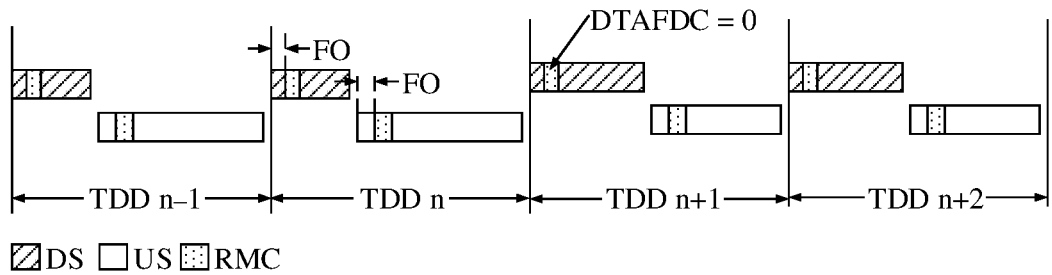
FIG. 3 is a schematic diagram of a DTA mechanism according to an embodiment of the present invention

In addition, for the TDD duplex manner, a DTA mechanism may further be used to allocate an appropriate upstream transmission ratio and/or an appropriate downstream transmission ratio based on a change of upstream and/or downstream traffic. The following briefly describes the DTA mechanism with reference to FIG. 3: The CO side sends a DTA message by using downstream robustness management channel (RMC) message. The DTA message includes downstream transmission duration (Mds) and a DTA frame down count (DTAFDC). The DTA message is repeatedly sent by using RMC messages in all TDD frames, and Mds in the DTA message remains unchanged during repeated sending. However, the DTAFDC decreases gradually until the DTAFDC changes to 0, and then the CO side and the remote side make new Mds take effect. The Mds is duration (a quantity of symbols), used for downstream transmission, in a TDD frame after time assignment, and may also be referred to as a length of a downstream transmission duration. Making the new Mds take effect is adjusting a length of a downstream transmission duration in a TDD frame to the Mds, and adjusting a length of an upstream transmission duration to MF-Mds_New-A, where MF is a quantity of symbols included in the TDD frame, A is a quantity of symbols in the TDD frame that are used for upstream and downstream switching, and a value of A is usually 1. It should be noted that, referring to FIG. 3, an upstream transmission duration and a downstream transmission duration include an RMC symbol each, and a part, before the RMC symbol (between expiration of a previous upstream and downstream switching time period and start of the RMC symbol), of each of the upstream transmission duration and the downstream transmission duration has fixed duration, that is, there is a fixed offset (FO). There is a time interval between an upstream transmission duration and a downstream transmission duration that are adjacent, and the time interval is used as an upstream and downstream switching time period. Each TDD frame includes two upstream and downstream switching time periods, and a sum of the two upstream and downstream switching time periods is the foregoing A symbols.

Only a single-port situation is mentioned in a current DTA mechanism. For a multi-port scenario of FTrdp CO equipment, during dynamic time assignment, upstream and downstream time need to be configured for all signals in a same TDD frame, otherwise upstream and downstream time may be asynchronous for different signals and consequently near-end crosstalk is caused.

However, in a multi-port scenario of the FTrdp CO equipment, an RMC channel in downstream of a port may be damaged by burst noise, an FTU-R is temporarily incapable of making new Mds take effect, or there may be another case. Consequently, near-end crosstalk is caused by asynchronous upstream and downstream time.

To overcome near-end crosstalk caused by asynchronous upstream and downstream time in a multi-port scenario of FTTdp CO equipment, the embodiments of the present invention provide a dynamic time assignment method, apparatus, and system. For details, refer to the following embodiments.

The following first describes, with reference to a specific hardware structure, a dynamic time assignment apparatus according to an embodiment of the present invention.

Figure 4:
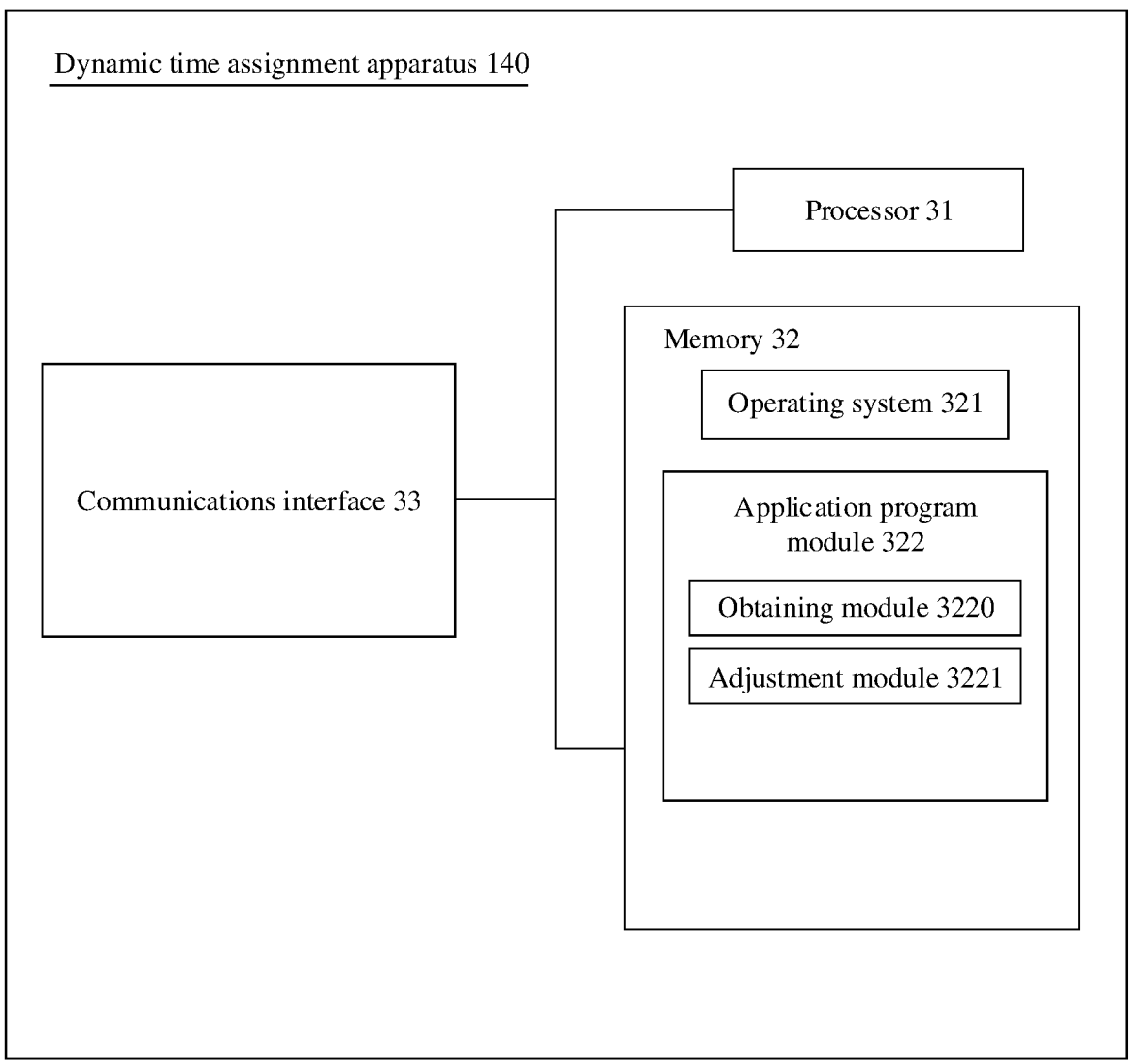
FIG. 4 is a schematic structural diagram of a dynamic time assignment apparatus according to an embodiment of the present invention.

FIG. 4 is a structural block diagram of a dynamic time assignment apparatus 140 according to an embodiment of the present invention. The dynamic time assignment apparatus 140 may be the foregoing central office equipment. Referring to FIG. 4, the dynamic time assignment apparatus 140 may include components such as a processor 31 including one or more processing cores, a memory 32 including one or more computer readable storage media, and a communications interface 33. The processor 31 may be connected to the memory 32 and the communications interface 33 by using buses. A person skilled in the art may understand that the structure shown in FIG. 4 does not constitute a limitation on the dynamic time assignment apparatus 140, and the dynamic time assignment apparatus 140 may include more or fewer components than those shown in the figure, a combination of some components, or components disposed differently.

The processor 31 is a control center of the dynamic time assignment apparatus 140, and is connected to all components of the entire dynamic time assignment apparatus 140 by using various interfaces and lines. By running or executing software programs and/or application program modules stored in the memory 32, and invoking data stored in the memory 32, the processor 31 performs various functions of the dynamic time assignment apparatus 140 and processes data, to perform overall monitoring on the dynamic time assignment apparatus 140. Optionally, the processor 31 may include one or more processing units, and the processing unit may be a central processing unit (CPU for short), a network processor (NP for short), or the like.

The communications interface 33 may be implemented as a communications chip. The communications chip may include a receiving module, a transmission module, a modulation and demodulation module, and the like, and is configured to: modulate and demodulate information, and receive or send the information by using a radio signal. The communications interface 33 is controlled by the processor 31.

The memory 32 may be configured to store various data, such as various configuration parameters, and a software program and/or an application program module. The software program and/or the application program module may be executed by the processor 31. The memory 32 may mainly include a program storage area and a data storage area. The program storage area may store an operating system 321 and an application program module 322 corresponding to at least one function, for example, an obtaining module and an adjustment module. The data storage area may store data created according to use of the dynamic time assignment apparatus 140, for example, a length of a new downstream transmission duration or a length of a current downstream transmission duration. In addition, the memory 32 may include a high-speed random access memory, and may further include a non-volatile memory such as at least one magnetic disk storage device, a flash memory device, or another non-volatile solid-state storage device. Correspondingly, the memory 32 may further include a memory controller, to provide the processor 31 with access to the memory 32.

The application program module 322 includes at least: an obtaining module 3220 configured to obtain the length of the new downstream transmission duration; and an adjustment module 3221 configured to adjust a length or lengths of an upstream transmission duration or a downstream transmission duration.

The obtaining module 3220 is configured to obtain the length of the new downstream transmission duration.

The adjustment module 3221 is configured to: when the length of the new downstream transmission duration is less than lengths of current downstream transmission durations of the at least two transceivers of the central office equipment, adjust lengths of current upstream transmission durations of the at least two transceivers to a length of a new upstream transmission duration after shortening the lengths of the current downstream transmission durations of the at least two transceivers to the length of the new downstream transmission duration; or when the length of the new downstream transmission duration is greater than lengths of current downstream transmission durations of the at least two transceivers, adjust the lengths of the current downstream transmission durations of the at least two transceivers to the length of the new downstream transmission duration after shortening lengths of current upstream transmission durations of the at least two transceivers to a length of a new upstream transmission duration. A sum of the length of the new upstream transmission duration and the length of the new downstream transmission duration is equal to a length obtained by subtracting upstream and downstream switching duration from one transmission frame.

Figure 5:
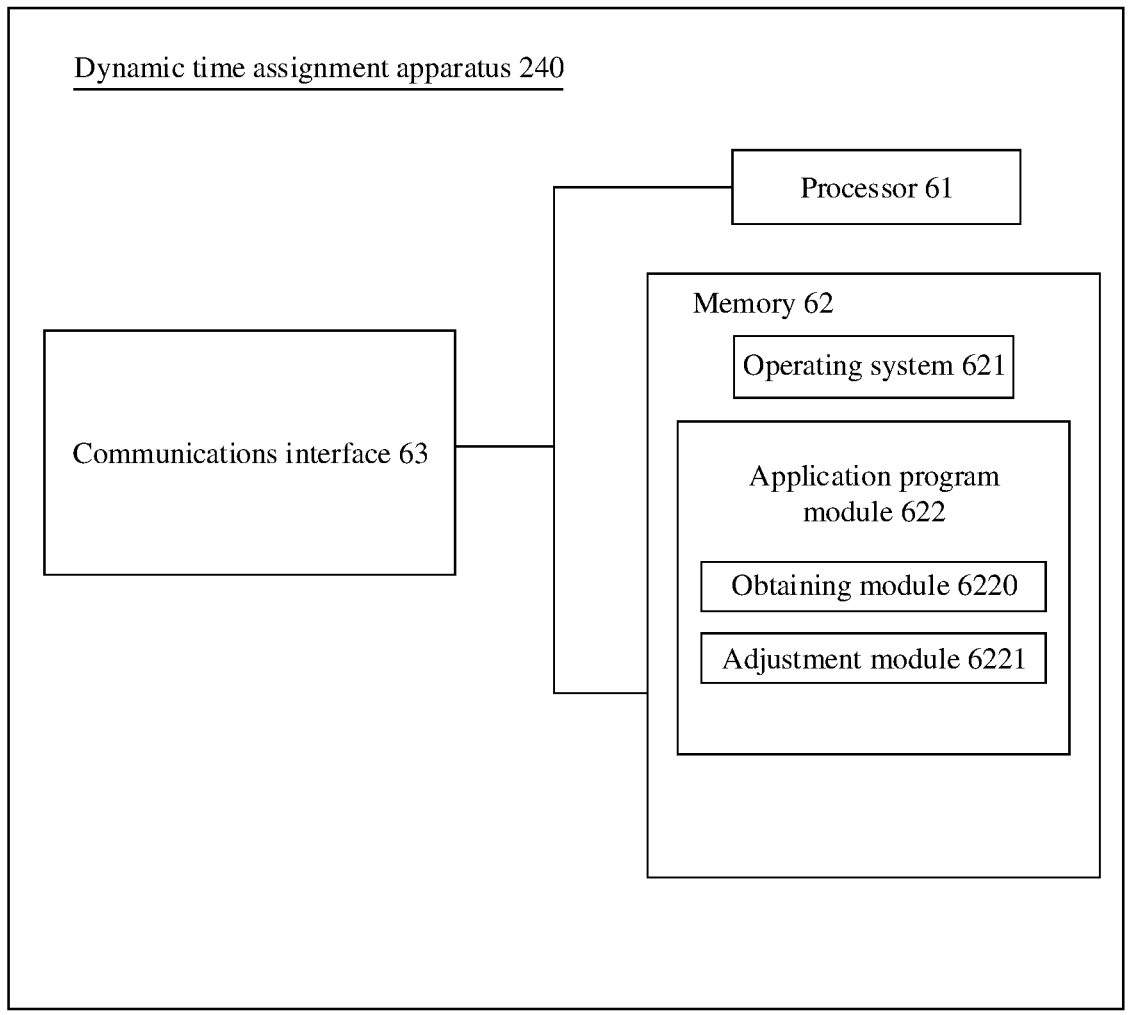
FIG. 5 is a schematic structural diagram of another dynamic time assignment apparatus according to an embodiment of the present invention.

FIG. 5 is a structural block diagram of a dynamic time assignment apparatus 240 according to an embodiment of the present invention. The dynamic time assignment apparatus 240 may be the foregoing customer premise equipment. Referring to FIG. 5, the dynamic time assignment apparatus 240 may include components such as a processor 61 including one or more processing cores, a memory 62 including one or more computer readable storage media, and a communications interface 63. The processor 61 may be connected to the memory 62 and the communications interface 63 by using buses. A person skilled in the art may understand that the structure shown in FIG. 5 does not constitute a limitation on the dynamic time assignment apparatus 240, and the dynamic time assignment apparatus 240 may include more or fewer components than those shown in the figure, a combination of some components, or components disposed differently.

The processor 61 is a control center of the dynamic time assignment apparatus 240, and is connected to all components of the entire dynamic time assignment apparatus 240 by using various interfaces and lines. By running or executing software programs and/or application program modules stored in the memory 62, and invoking data stored in the memory 62, the processor 61 performs various functions of the dynamic time assignment apparatus 240 and processes data, to perform overall monitoring on the dynamic time assignment apparatus 240. Optionally, the processor 61 may include one or more processing units. The processing unit may be a central processing unit (CPU for short), a network processor (NP for short), or the like.

The communications interface 63 may be implemented as a communications chip. The communications chip may include a receiving module, a transmission module, a modulation and demodulation module, and the like, and is configured to: modulate and demodulate information, and receive or send information by using a radio signal. The communications interface 63 is controlled by the processor 61.

The memory 62 may be configured to store various data, such as various configuration parameters, and a software program and/or an application program module. The software program and/or the application program module may be executed by the processor 61. The memory 62 may mainly include a program storage area and a data storage area. The program storage area may store an operating system 621 and an application program module 622 corresponding to at least one function, for example, an obtaining module and an adjustment module. The data storage area may store data created according to use of the dynamic time assignment apparatus 240, for example, a length of a new downstream transmission duration or a length of a current downstream transmission duration. In addition, the memory 62 may include a high-speed random access memory, and may further include a non-volatile memory such as at least one magnetic disk storage device, a flash memory device, or another non-volatile solid-state storage device. Correspondingly, the memory 62 may further include a memory controller, to provide the processor 61 with access to the memory 62.

The application program module 622 includes at least: an obtaining module 6220 configured to obtain the length of the new downstream transmission duration; and an adjustment module 6221 configured to adjust a length or lengths of an upstream transmission duration or a downstream transmission duration.

The obtaining module 6220 is configured to obtain the length of the new downstream transmission duration.

The adjustment module 6221 is configured to: when the length of the new downstream transmission duration is less than a length of a current downstream transmission duration of a transceiver of the customer premise equipment, adjust a length of a current upstream transmission duration of the transceiver of the customer premise equipment to a length of a new upstream transmission duration after shortening the length of the current downstream transmission duration of the transceiver of the customer premise equipment to the length of the new downstream transmission duration; or when the length of the new downstream transmission duration is greater than a length of a current downstream transmission duration of a transceiver of the customer premise equipment, adjust the length of the current downstream transmission duration of the transceiver of the customer premise equipment to the length of the new downstream transmission duration after shortening a length of a current upstream transmission duration of the transceiver of the customer premise equipment to the length of the new upstream transmission duration. A sum of the length of the new upstream transmission duration and the length of the new downstream transmission duration is equal to a length obtained by subtracting upstream and downstream switching duration from one transmission frame.

Figure 6:
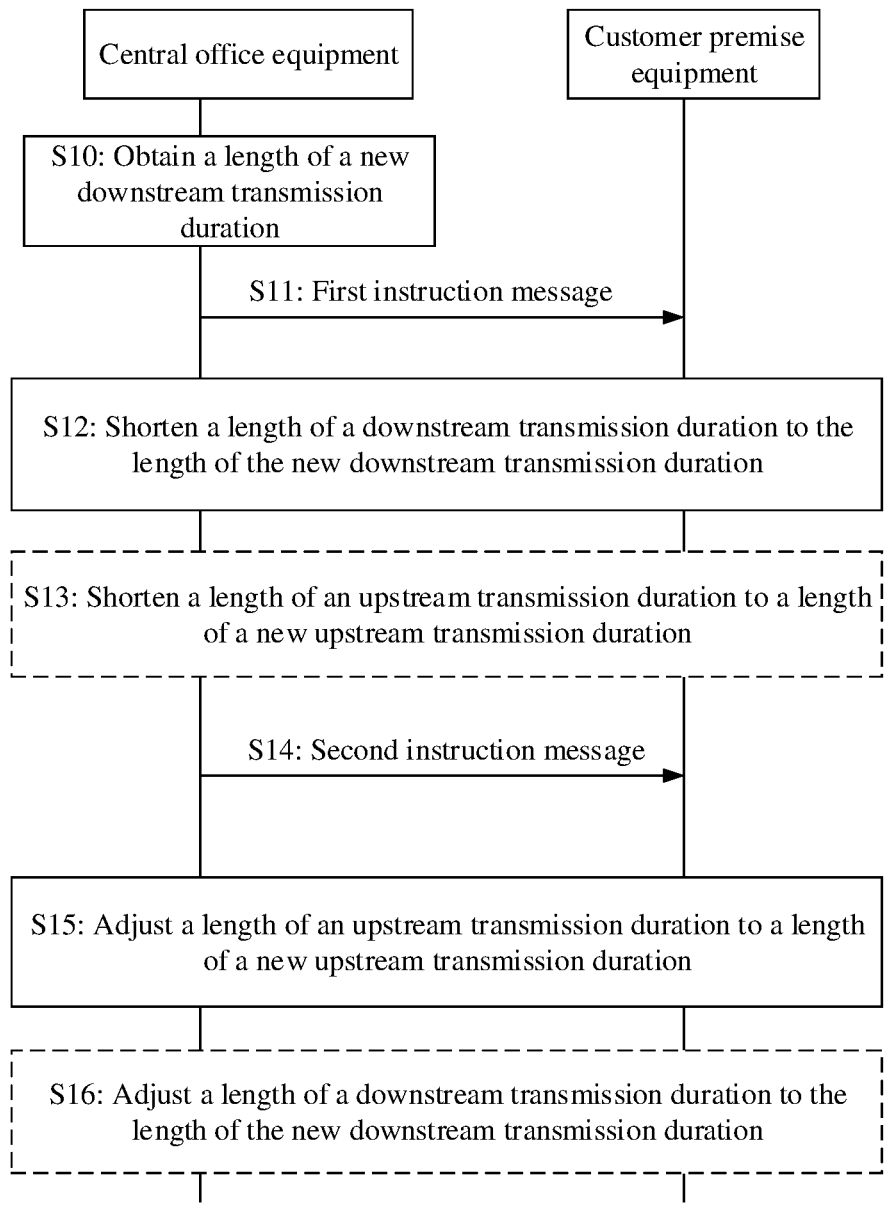
FIG. 6 is a flowchart of a dynamic time assignment method according to an embodiment of the present invention.

An embodiment of the present invention provides a dynamic time assignment method. Referring to FIG. 6, the method is executed by central office equipment and customer premise equipment, and the central office equipment includes at least two transceivers. The dynamic time assignment method provided in the present invention may be applied to only some transceivers (at least two transceivers) of the central office equipment, or may be applied to all transceivers of the central office equipment. In this embodiment of the present invention, descriptions are provided by using an example in which all transceivers of the central office equipment need to adjust lengths of upstream and downstream transmission durations. Another embodiment may alternatively be specific for only some transceivers (for example, at least two transceivers) of the central office equipment. The dynamic time assignment method includes the following steps.

Step S10: The central office equipment obtains a length of a new downstream transmission duration.

Specifically, the central office equipment determines the length of the new downstream transmission duration based on at least one of conditions such as traffic and power consumption of at least two transceivers of the central office equipment. The action of determining a length of a new downstream transmission duration may be performed by a unit having a calculation function, such as a CPU or a digital signal processing (DSP) chip inside the central office equipment.

After obtaining the length of the new downstream transmission duration, the central office equipment may determine a length of a new upstream transmission duration based on the length of the new downstream transmission duration because the sum of the length of the upstream transmission duration and the length of the downstream transmission duration is equal to a total length of one transmission frame minus upstream and downstream switching duration. The transmission frame may be specifically a TDD frame. Certainly, in another embodiment, alternatively, the central office equipment may first obtain a length of a new upstream transmission duration, and then determine a length of a new downstream transmission duration based on the length of the new upstream transmission duration.

After obtaining the length of the new downstream transmission duration, the central office equipment may further compare the length of the new downstream transmission duration with a length of a current downstream transmission duration, to facilitate subsequent steps.

Step S11: The central office equipment sends a first instruction message to the customer premise equipment, where the first instruction message includes the length of the new downstream transmission duration.

In this step, the central office equipment may send the first instruction message by using a downstream RMC symbol. The first instruction message may be a DTA message. The new downstream transmission duration indicated by the first instruction message includes Mds_New symbols.

In this embodiment of the present invention, the downstream is from the central office equipment to the customer premise equipment, and the upstream is from the customer premise equipment to the central office equipment. The downstream transmission duration is duration including a symbol used for downstream transmission in one transmission frame, and the upstream transmission duration is duration including a symbol used for upstream transmission in one transmission frame.

In this embodiment of the present invention, the central office equipment sends one first instruction message by using each transceiver. First instruction messages sent by different transceivers are used to instruct to perform dynamic time assignment with transceivers of customer premise equipments that are corresponding to the transceivers of the central office equipment, and the first instruction messages sent by the different transceivers include the length of the same new downstream transmission duration.

Further, the first instruction message further includes effective time. First instruction messages sent by different transceivers may include same effective time, or first instruction messages sent by different transceivers may include different effective time. The effective time of the first instruction message is time at which the customer premise equipment is required or expected to shorten the length of the downstream transmission duration to the length of the new downstream transmission duration, or to shorten the length of the upstream transmission duration to the length of the new upstream transmission duration.

In this embodiment of the present invention, the first instruction message is used to instruct to change the length of the downstream transmission duration to min(Mds_old, Mds_new), and change the length of the upstream transmission duration to min(MF-Mds_old-A, MF-Mds_new-A). Mds_old is a quantity of symbols included in the current downstream transmission duration, and the current downstream transmission duration is a downstream transmission duration before a length of an upstream transmission duration or a downstream transmission duration (upstream transmission duration or downstream transmission duration) is adjusted based on the first instruction message. MF-Mds_New-A is the length of the new upstream transmission duration, and MF-Mds_Old-A is the length of the current upstream transmission duration.

Step S12: When the length of the new downstream transmission duration is less than a length of the current downstream transmission duration, the central office equipment and the customer premise equipment shorten a length of a downstream transmission duration to the length of the new downstream transmission duration.

Specifically, the central office equipment shortens lengths of downstream transmission durations of all transceivers of the central office equipment to the length of the new downstream transmission duration. The customer premise equipment shortens a length of a downstream transmission duration of a transceiver of the customer premise equipment to the length of the new downstream transmission duration. The length of the upstream transmission duration of the transceiver is a length of a time period within which the transceiver transmits upstream data in one transmission frame, and the length of the downstream transmission duration of the transceiver is a length of a time period within which the transceiver transmits downstream data in one transmission frame. The length of the upstream transmission duration or the length of the downstream transmission duration may be a quantity of symbols included in the upstream transmission duration or the downstream transmission duration.

The shortening a length of a downstream transmission duration to the length of the new downstream transmission duration may include: determining a position of the last symbol of the downstream transmission duration without changing a position of the first symbol of the downstream transmission duration, and using the (Mds_New)$^{th}$ (a quantity of symbols in the new downstream transmission duration) symbol as the last symbol of the downstream transmission duration.

Before the central office equipment has shortened the lengths of the downstream transmission durations of all the transceivers of the central office equipment to the length of the new downstream transmission duration, the method further includes the following step:

The central office equipment processes the (Mds_New+1)$^{th}$ to the (Mds_Old)$^{th}$ symbols in the downstream transmission durations by using a downstream precoding technology. For a signal for which a length of a downstream transmission duration has been shortened, an idle symbol (idle symbol) is transmitted in the (Mds_New+1)$^{th}$ to the (Mds_Old)$^{th}$ symbols in the downstream transmission duration. The idle symbol means that 0 is transmitted as an input signal in a symbol in which no data is sent. In a process of shortening the length of the downstream transmission duration, not all lengths of the downstream transmission durations corresponding to all the transceivers of the central office equipment can be shortened simultaneously. Therefore, when lengths of some downstream transmission durations are shortened, but lengths of the other downstream transmission durations are not shortened yet, processing still needs to be performed by using the downstream precoding technology in this period of time until lengths of all the downstream transmission durations are shortened, to overcome far-end crosstalk.

Processing the $(Mds\_New+1)^{th}$ to the $(Mds\_Old)^{th}$ symbols in the downstream transmission durations by using the downstream precoding technology means processing a signal by using the downstream precoding technology within a time period from the $(Mds\_New+1)^{th}$ to the $(Mds\_Old)^{th}$ symbols in the downstream transmission duration.

When performing processing by using the downstream precoding technology, the central office equipment needs to process each signal.

Certainly, for the $1^{st}$ to the $(Mds\_New)^{th}$ symbols in the downstream transmission duration, processing needs to be performed by using the downstream precoding technology at any time.

It is easy to learn that, in this embodiment of the present invention, the central office equipment and the customer premise equipment may perform step S12 simultaneously, for example, the central office equipment and the customer premise equipment both perform step S12 after performing step S11; or may not perform step S12 simultaneously, for example, the central office equipment performs step S12 when or before performing step S11 (because the central office equipment may have determined the length of the new downstream transmission duration before step S11, step S12 may be performed first based on the length), but the customer premise equipment performs step S12 after performing step S11.

In this embodiment of the present invention, that the central office equipment shortens a length of a downstream transmission duration to the length of the new downstream transmission duration means that the central office equipment shortens a length of a sending duration by adjusting a configuration of a transmit end. That the customer premise equipment shortens a length of a downstream transmission duration to the length of the new downstream transmission duration means that the customer premise equipment shortens a length of a receiving interval by adjusting a configuration of a receive end.

Step S13: When the length of the new downstream transmission duration is greater than a length of the current downstream transmission duration, the central office equipment and the customer premise equipment shorten a length of an upstream transmission duration to the length of the new upstream transmission duration.

Specifically, the central office equipment shortens lengths of upstream transmission durations of all the transceivers of the central office equipment to the length of the new upstream transmission duration. The customer premise equipment shortens a length of an upstream transmission duration of the transceiver of the customer premise equipment to the length of the new upstream transmission duration.

The shortening a length of an upstream transmission duration to the length of the new upstream transmission duration may include: determining a position of the first symbol of the upstream transmission duration without changing a position of the last symbol of the upstream transmission duration, and using the $(Mds\_New-Mds\_Old)^{th}$ symbol of the current upstream transmission duration as the first symbol of the new upstream transmission duration.

Correspondingly, a position of an RMC symbol in the upstream transmission duration is changed when or after the length of the upstream transmission duration is shortened. Specifically, the RMC symbol is moved backward by $Mds\_New-Mds\_Old$ symbols.

Before all customer premise equipments have shortened lengths of upstream transmission durations of transceivers of customer premise equipments to the length of the new upstream transmission duration, the method further includes the following step:

The central office equipment processes the $1^{st}$ to the $(Mds\_New-Mds\_Old)^{th}$ symbols in the upstream transmission durations by using an upstream joint reception technology. In a process of shortening the length of the upstream transmission duration, not all lengths of the upstream transmission durations corresponding to the transceivers of all the customer premise equipments can be shortened simultaneously. Therefore, when lengths of some upstream transmission durations are shortened, but lengths of the other upstream transmission durations are not shortened yet, processing still needs to be performed by using the upstream joint reception technology in this period of time until lengths of all the upstream transmission durations are shortened, to overcome far-end crosstalk.

The $1^{st}$ to the $(Mds\_New-Mds\_Old)^{th}$ symbols in the upstream transmission duration are processed by using the upstream joint reception technology, and a signal is processed by using the upstream joint reception technology within a time period from the $1^{st}$ to the $(Mds\_New-Mds\_Old)^{th}$ symbols in the upstream transmission duration.

When performing processing by using the upstream joint reception technology, the central office equipment needs to process each signal.

Certainly, for a subsequent symbol in the upstream transmission duration, processing needs to be performed by using the upstream joint reception technology at any time.

It is easy to learn that, in this embodiment of the present invention, the central office equipment and the customer premise equipment may perform step S13 simultaneously, for example, the central office equipment and the customer premise equipment both perform step S12 after performing step S11; or may not perform step S13 simultaneously, for example, the central office equipment performs step S13 when or before performing step S1, but the customer premise equipment performs step S13 after performing step S11. Step S13 and step S12 are optional, and only one step takes effect at a same time point.

In this embodiment of the present invention, that the central office equipment shortens a length of an upstream transmission duration to the length of the new upstream transmission duration means that the central office equipment shortens a length of a receiving interval by adjusting a configuration of a receive end. That the customer premise equipment shortens a length of an upstream transmission duration to the length of the new upstream transmission duration means that the customer premise equipment shortens a length of a sending duration by adjusting a configuration of a transmit end.

Step S14: After the lengths of the downstream transmission durations of all the transceivers of the central office equipment have been shortened to the length of the new downstream transmission duration, or after the lengths of the upstream transmission durations of the transceivers of all the customer premise equipments have been shortened to the length of the new upstream transmission duration, the central office equipment sends second instruction message to the customer premise equipments.

The second instruction messages are used to instruct the customer premise equipments to adjust all of the lengths of the upstream transmission durations and/or the downstream transmission durations of the transceivers of all the customer premise equipments to the length of the upstream transmission duration and the length of the downstream transmission duration that are determined based on the length of the downstream transmission duration in the first instruction message.

Specifically, for details about how to determine that all of the lengths of the upstream transmission durations of the transceivers of all the customer premise equipments have been shortened to the length of the new upstream transmission duration, refer to the following descriptions.

In this embodiment of the present invention, the central office equipment sends one second instruction message by using each transceiver, and second instruction messages sent by different transceivers are used to instruct to perform dynamic time assignment with the transceivers of the customer premise equipments that are corresponding to the transceivers of the central office equipment. The second instruction messages sent by the different transceivers include the length of the same new downstream transmission duration, and the length of the new downstream transmission duration is the same as that in the first instruction message.

Further, the second instruction message further includes effective time. Second instruction messages sent by different transceivers may include same effective time, or second instruction messages sent by different transceivers may include different effective time. The effective time of the second instruction message is time at which the customer premise equipment adjusts (prolongs) the length of the upstream transmission duration to the length of the new upstream transmission duration, or to shorten the length of the downstream transmission duration to the length of the new downstream transmission duration.

In another embodiment, the second instruction message may alternatively have only an indication function, and does not include content such as a length and effective time of the new downstream transmission duration.

Further, the method further includes: determining, by the central office equipment, whether the lengths of the downstream transmission durations of all the transceivers of the central office equipment have been shortened to the length of the new downstream transmission duration, or determining, by the central office equipment, whether the lengths of the upstream transmission durations of the transceivers of all the customer premise equipments have been shortened to the length of the new upstream transmission duration.

The downstream transmission durations of all the transceivers of the central office equipment are adjusted by the central office equipment. Therefore, the central office equipment can determine whether the downstream transmission durations of all the transceivers of the central office equipment have been shortened to the length of the new downstream transmission duration, only by recording adjustment time of a downstream transmission duration of each transceiver. The central office equipment uses two manners to determine whether the lengths of the upstream transmission durations of the transceivers of all the customer premise equipments have been shortened to the length of the new upstream transmission duration. One manner is that the central office equipment receives a third instruction message sent by the customer premise equipment, and performs determining based on the third instruction message, where the third instruction message is used to indicate a time point that is determined by the customer premise equipment and at which a transceiver of the customer premise equipment shortens a length of an upstream transmission duration to the length of the new upstream transmission duration. Another manner is that the central office equipment detects, frame by frame, a position of an upstream RMC symbol corresponding to the transceiver of the customer premise equipment and performs determining based on the position of the detected upstream RMC symbol. For details, refer to the following embodiments.

In this embodiment of the present invention, when the length of the new downstream transmission duration is less than the length of the current downstream transmission duration, the central office equipment and the customer premise equipment adjust a length of an upstream transmission duration after the lengths of the downstream transmission durations of all the transceivers of the central office equipment have been shortened to the length of the new downstream transmission duration and the lengths of the downstream transmission durations of the transceivers of all the customer premise equipments have been shortened to the length of the new downstream transmission duration. Correspondingly, the central office equipment sends a second instruction message to the customer premise equipment after the lengths of the downstream transmission durations of all the transceivers of the central office equipment have been shortened to the length of the new downstream transmission duration and the lengths of the downstream transmission durations of the transceivers of all the customer premise equipments have been shortened to the length of the new downstream transmission duration.

When the length of the new downstream transmission duration is greater than the length of the current downstream transmission duration, the central office equipment and the customer premise equipment may further adjust a length of a downstream transmission duration after the lengths of the upstream transmission durations of all the transceivers of the central office equipment have been shortened to the length of the new upstream transmission duration and the lengths of the upstream transmission durations of the transceivers of all the customer premise equipments have been shortened to the length of the new upstream transmission duration. Correspondingly, the central office equipment sends a second instruction message to the customer premise equipment after the lengths of the upstream transmission durations of all the transceivers of the central office equipment have been shortened to the length of the new upstream transmission duration and the lengths of the upstream transmission durations of the transceivers of all the customer premise equipments have been shortened to the length of the new upstream transmission duration.

Step S15: When the length of the new downstream transmission duration is less than the length of the current downstream transmission duration, the central office equipment and the customer premise equipment adjust a length of an upstream transmission duration to the length of the new upstream transmission duration.

Specifically, the central office equipment adjusts the lengths of the upstream transmission durations of all the transceivers of the central office equipment to the length of the new upstream transmission duration. The customer premise equipments adjust the lengths of the upstream transmission durations of the transceivers of all the customer premise equipments to the length of the new upstream transmission duration.

The adjusting (prolonging) the length of the upstream transmission duration to the length of the new upstream transmission duration may include: determining a position of the first symbol of the upstream transmission duration without changing a position of the last symbol of the upstream transmission duration, and using the (Mds_Old-Mds_New)$^{th}$ symbol of the current downstream transmission duration as the first symbol of the new upstream transmission duration.

Further, a position of an RMC symbol in the upstream transmission duration is changed. Specifically, the RMC symbol is moved forward by Mds_Old-Mds_New symbols.

After the central office equipment sends the second instruction message to the customer premise equipment, the method further includes: processing, by the central office equipment, the 1$^{st}$ to the (Mds_Old-Mds_New)$^{th}$ symbols in the upstream transmission durations by using an upstream joint reception technology.

Certainly, for a subsequent symbol in the upstream transmission duration, processing needs to be performed by using the upstream joint reception technology at any time.

It is easy to learn that, in this embodiment of the present invention, the central office equipment and the customer premise equipment may perform step S15 simultaneously, for example, the central office equipment and the customer premise equipment both perform step S15 after performing step S14; or may not perform step S15 simultaneously, for example, the central office equipment performs step S15 when performing step S14, but the customer premise equipment performs step S15 after performing step S14.

Step S16: When the length of the new downstream transmission duration is greater than the current downstream transmission duration, the central office equipment and the customer premise equipment adjust a length of a downstream transmission duration to the length of the new downstream transmission duration.

Specifically, the central office equipment adjusts the lengths of the downstream transmission durations of all the transceivers of the central office equipment to the length of the new downstream transmission duration. The customer premise equipments adjust the lengths of the downstream transmission durations of the transceivers of all the customer premise equipments to the length of the new downstream transmission duration.

The adjusting (prolonging) the length of the downstream transmission duration to the length of the new downstream transmission duration may include: determining a position of the last symbol of the downstream transmission duration without changing a position of the first symbol of the downstream transmission duration, and using the (Mds_New)$^{th}$ symbol as the last symbol of the downstream transmission duration.

That is, in this embodiment of the present invention, a time length of a transmission duration corresponding to a sender (for example, a downstream transmission duration of the central office equipment or an upstream transmission duration of the customer premise equipment) is first shortened, and then a time length of a transmission duration corresponding to a receiver is prolonged.

After the central office equipment sends the second instruction message to the customer premise equipment, the method further includes the following step:

The central office equipment processes the (Mds_Old+1)$^{th}$ to the (Mds_New)$^{th}$ symbols in the downstream transmission durations by using a downstream precoding technology. For a signal for which a length of the downstream transmission duration has been adjusted, an idle symbol is transmitted on the (Mds_Old+1)$^{th}$ to the (Mds_New)$^{th}$ symbols in the downstream transmission duration.

Certainly, for the 1$^{st}$ to the (Mds_Old)$^{th}$ symbols in the downstream transmission duration, processing needs to be performed by using the downstream precoding technology at any time.

It is easy to learn that, in this embodiment of the present invention, the central office equipment and the customer premise equipment may perform step S16 simultaneously, for example, the central office equipment and the customer premise equipment both perform step S16 after performing step S14; or may not perform step S16 simultaneously, for example, the central office equipment performs step S16 after performing step S14, but the customer premise equipment performs step S16 after performing step S14. Step S16 and step S15 are optional, and only one step takes effect at a same time point.

Figure 6A:
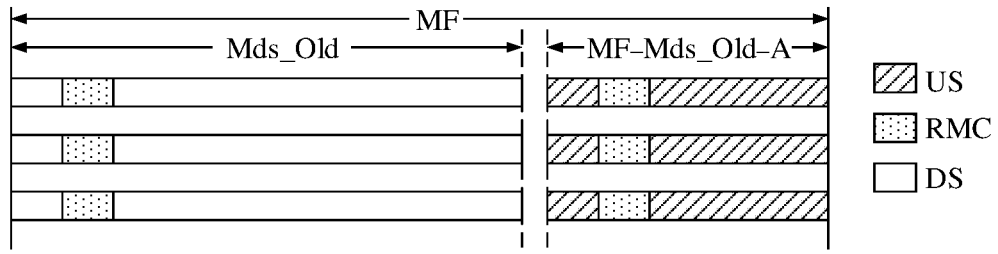
FIG. 6A to FIG. 6H are schematic diagrams of dynamic time assignment according to an embodiment of the present invention.
Figure 6B:
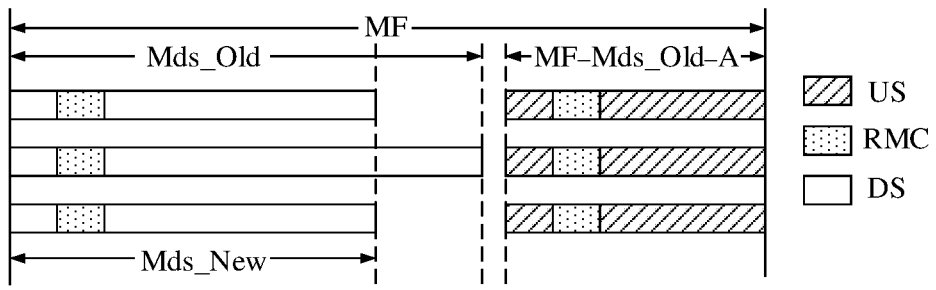
Figure 6C:
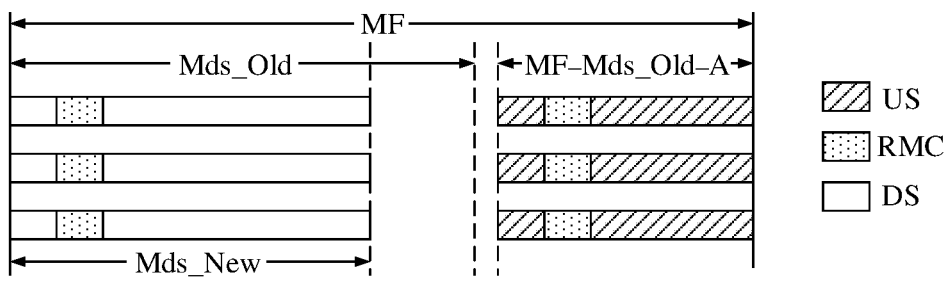
Figure 6D:
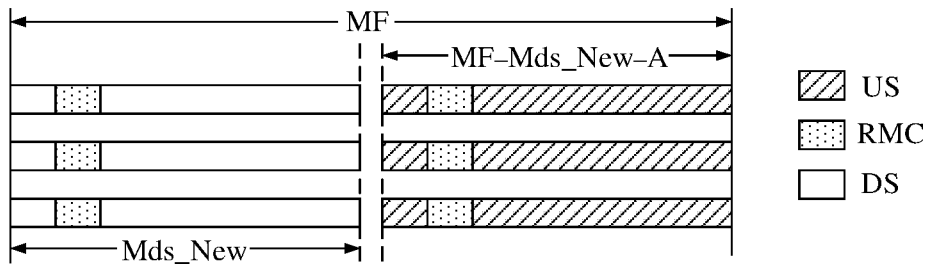

The following further describes the method provided in this embodiment of the present invention by using FIG. 6A to FIG. 6D and FIG. 6E to FIG. 6H as examples. In the two examples, three signals corresponding to three transceivers of central office equipment (an FTU-O 1 to an FTU-O3) are used as an example for description. In practice, there may be more or fewer signals (at least two signals):

In the examples shown in FIG. 6A to FIG. 6D, Mds_New<Mds_Old, that is, the length of the new downstream transmission duration (DS) is less than the length of the current downstream transmission duration. As shown in FIG. 6A, before time assignment, a length of a downstream transmission duration is Mds_Old, and a length of an upstream transmission duration is MF-Mds_Old-A. As shown in FIG. 6B, during time assignment, the length of the downstream transmission duration is first shortened to Mds_New until lengths of downstream transmission durations corresponding to all the transceivers of the central office equipment are all shortened to Mds_New, as shown in FIG. 6C. Then, the length of the upstream transmission duration (US) is prolonged to MF-Mds_New-A, as shown in FIG. 6D.

Figure 6E:
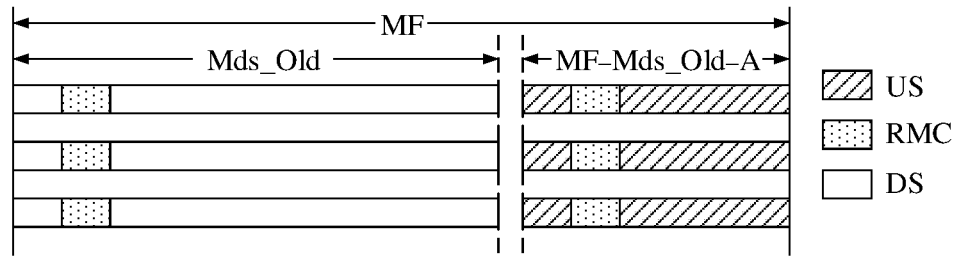
Figure 6F:
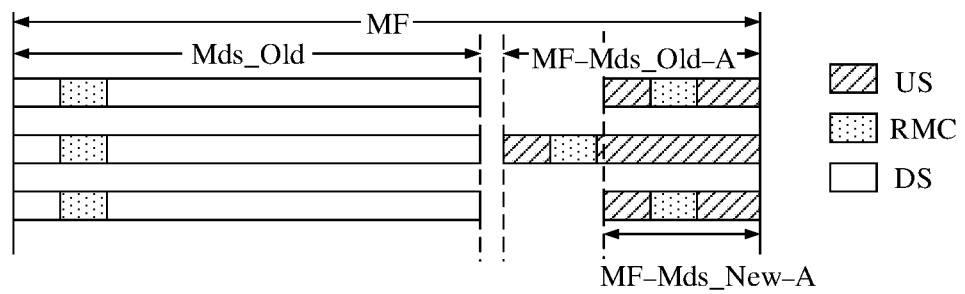
Figure 6G:
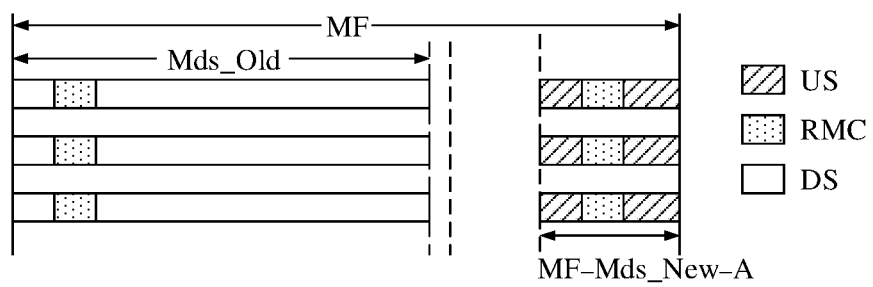
Figure 6H:
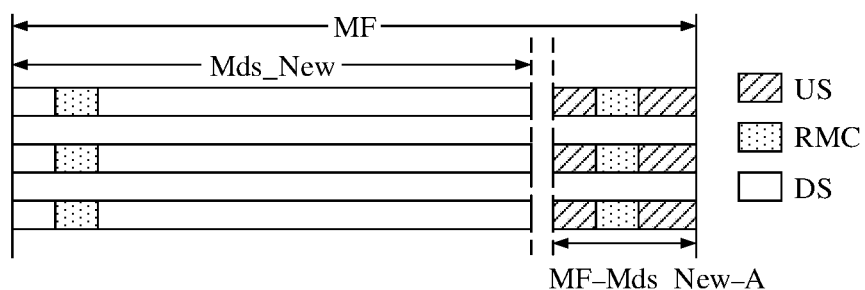

In the examples shown in FIG. 6E to FIG. 6H, Mds_New>Mds_Old, that is, the length of the new downstream transmission duration is greater than a length of a current downstream transmission duration. As shown in FIG. 6E, before time assignment, a length of a downstream transmission duration is Mds_Old, and a length of an upstream transmission duration is MF-Mds_Old-A. As shown in FIG. 6F, during time assignment, the length of the upstream transmission duration is first shortened to MF-Mds_New-A until lengths of upstream transmission durations corresponding to all the transceivers of the central office equipment are all shortened to MF-Mds_New-A, as shown in FIG. 6G. Then, the length of the downstream transmission duration is prolonged to Mds_New, as shown in FIG. 6H.

Figure 7:
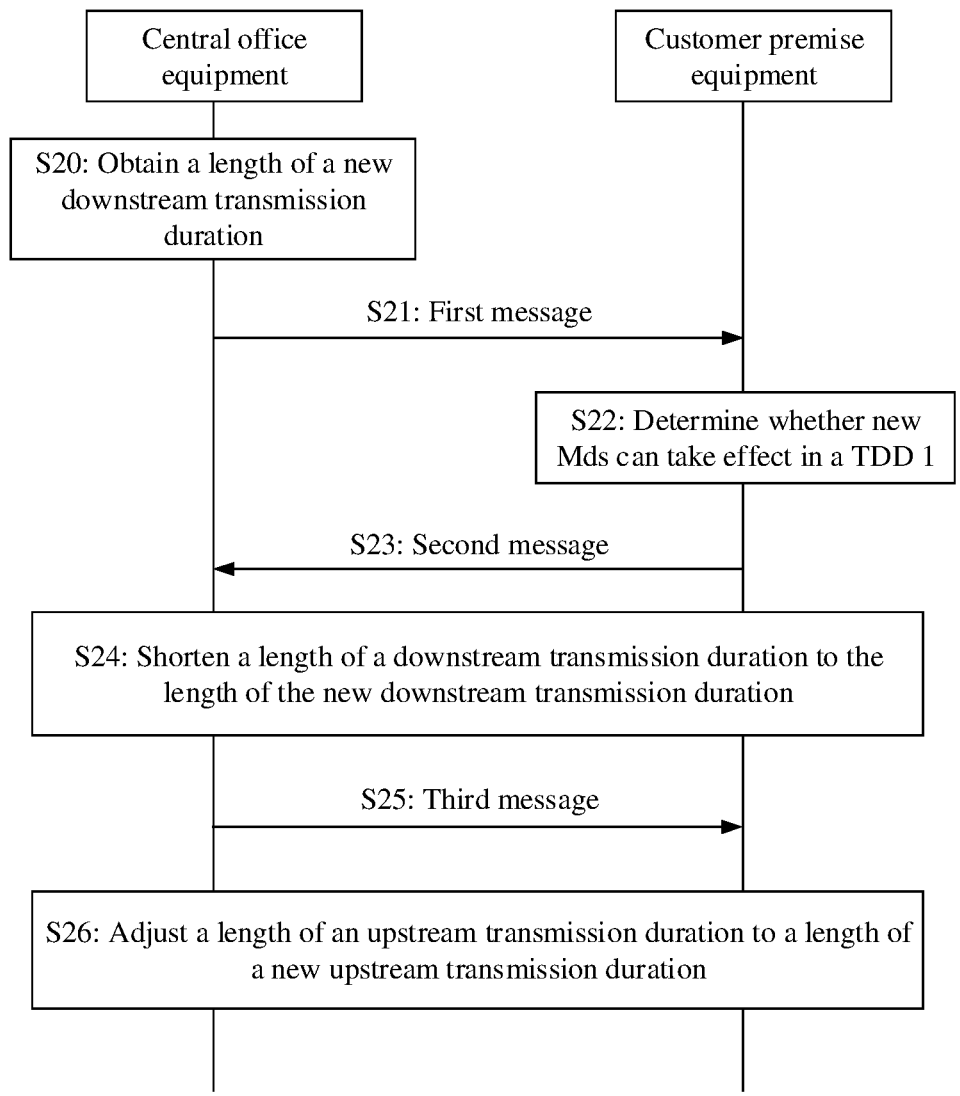
FIG. 7 is a flowchart of another dynamic time assignment method according to an embodiment of the present invention.

FIG. 7 is a flowchart of a dynamic time assignment method according to an embodiment of the present invention. In the method process provided in FIG. 7, a length of a new downstream transmission duration is less than a length of a current downstream transmission duration, and in the method, customer premise equipment sends a second message (including effective time determined by the customer premise equipment) to central office equipment. Referring to FIG. 7, the method includes the following steps.

Step S20: The central office equipment obtains the length of the new downstream transmission duration;

For a specific procedure, refer to step S10.

Step S21: The central office equipment sends a first message to the customer premise equipment, where the first message includes Mds and effective time TDD 1, and the Mds includes the length of the new downstream transmission duration.

In this step, the first message may use a format of a DTA message, that is, the central office equipment sends the Mds to the customer premise equipment by sending a DTA message by using a downstream RMC symbol. The DTA message includes the Mds and DTAFDC (used to indicate a position of the TDD 1). The new downstream transmission duration indicated by the Mds includes Mds_New symbols. The DTAFDC is used to indicate effective time TDD 1, and the effective time is a time point that is determined by the central office equipment and at which the length of the downstream transmission duration is shortened to the length of the new downstream transmission duration.

The central office equipment may repeatedly send the DTA message in a TDD frame before the TDD 1 (including the TDD 1). A value of the Mds remains unchanged each time when the DTA message is sent, and a DTAFDC decreases gradually (1 is subtracted from each transmission frame) until the TDD 1; in this case, the DTAFDC changes to 0.

In this embodiment of the present invention, the central office equipment sends a first message to a transceiver of corresponding customer premise equipment by using each transceiver. A transceiver of the central office equipment and a transceiver of corresponding customer premise equipment are a transceiver of central office equipment and a transceiver of customer premise equipment that transmit a same signal.

The TDD 1 is determined by the central office equipment based on implementation capability of the central office equipment and implementation capability of the customer premise equipment, and the implementation capability of the customer premise equipment is reported to the central office equipment when the customer premise equipment is initialized. The implementation capability herein includes capability of each transceiver in the equipment, for example, a minimum initial DTAFDC value (min initial DTAFDC). For example, if the min initial DTAFDC value of the transceiver reported by the customer premise equipment during initialization is A0, the central office equipment is to send a first message in a TDD 0, and may shorten a downstream transmission duration or an upstream transmission duration in a TDD 0'. In this case, the TDD 1 may be equal to max(TDD 0', TDD 0+A0).

In this step, the TDD 1 is specifically a time point that is determined by the central office equipment and at which the length of the downstream transmission duration is shortened to the length of the new downstream transmission duration. It should be noted that, for transceivers of different customer premise equipments, specific positions of the TDD 1 indicated in the first message may also be different. The first message herein is the foregoing first instruction message.

Step S22: The customer premise equipment receives the first message, and determines whether the length of the downstream transmission duration can be shortened to the length of the new downstream transmission duration in the TDD 1.

In this step, after receiving the first message, the customer premise equipment obtains the Mds and the DTAFDC; determine the TDD 1 based on the DTAFDC; determines whether the length of the downstream transmission duration can be shortened to the length of the new downstream transmission duration in the TDD 1.

Specifically, the customer premise equipment determines, based on implementation capability of a transceiver, whether each transceiver can shorten a length of a downstream transmission duration to the length of the new downstream transmission duration in the TDD 1.

Step S23: The customer premise equipment sends a second message to the central office equipment, where the second message is used to indicate effective time determined by the customer premise equipment.

Specifically, the customer premise equipment needs to send a second message by using each transceiver. The second message is used to indicate effective time of each transceiver determined by customer premise equipment.

Specifically, if a transceiver of customer premise equipment can shorten a length of a downstream transmission duration to the length of the new downstream transmission duration in the TDD 1, the effective time of the transceiver of the customer premise equipment that is determined by the customer premise equipment and that is indicated by the second message is the TDD 1. If the transceiver of the customer premise equipment cannot shorten the length of the downstream transmission duration to the length of the new downstream transmission duration in the TDD 1, the effective time of the transceiver of the customer premise equipment that is determined by the customer premise equipment and that is indicated by the second message is a TDD 2. The TDD 2 is new effective time determined by the customer premise equipment, and the new effective time is a time point that is determined by the customer premise equipment and at which the length of the downstream transmission duration is shortened to the length of the new downstream transmission duration. It should be noted that, for transceivers of different customer premise equipments, specific positions of the TDD 2 indicated in the second message may also be different. The second message herein is the foregoing third instruction message.

Further, to simplify the second message, if the transceiver of the user equipment can shorten the length of the downstream transmission duration to the length of the new downstream transmission duration in the TDD 1, the second message may not include the TDD 1, but uses a simple acknowledgment (ACK) message to indicate that the transceiver of the customer premise equipment can shorten the length of the downstream transmission duration to the length of the new downstream transmission duration in the TDD 1.

In this step, the customer premise equipment sends the second message by using an upstream RMC symbol. The second message may use the DTAFDC to indicate the effective time TDD 2 determined by the customer premise equipment. The customer premise equipment may repeatedly send the second message in a TDD frame before the TDD 2 (including the TDD 2). A DTAFDC decreases gradually (1 is subtracted from each transmission frame) until the TDD 2; in this case, the DTAFDC changes to 0.

Step S24: The central office equipment and the customer premise equipment shorten a length of a downstream transmission duration to the length of the new downstream transmission duration.

In this step, the central office equipment selects, based on a status of the central office equipment, an appropriate frame to shorten a length of a downstream transmission duration of each transceiver. The central office equipment determines, based on a time point at which the length of the downstream transmission duration of each transceiver is shortened to the length of the new downstream transmission duration, a time point at which lengths of downstream transmission durations of all transceivers of the central office equipment are shortened to the length of the new downstream transmission duration. The time point at which the lengths of the downstream transmission durations of all the transceivers of the central office equipment are shortened to the time of the length of the new downstream transmission duration is a time point at which the last transceiver in all the transceivers of the central office equipment shortens a length of a downstream transmission duration to the length of the new downstream transmission duration.

For the customer premise equipment, if the customer premise equipment determines that a transceiver can shorten a length of a downstream transmission duration to the length of the new downstream transmission duration in the effective time TDD 1, the length of the downstream transmission duration of the transceiver is shortened in the TDD 1. If the customer premise equipment determines that a transceiver cannot shorten a length of a downstream transmission duration to the length of the new downstream transmission duration in TDD 1, the length of the downstream transmission duration of the transceiver is shortened in TDD 2.

In this step, the TDD 2 is specifically a time point that is determined by the customer premise equipment and at which a length of a downstream transmission duration of a transceiver is shortened to the length of the new downstream transmission duration.

Before the central office equipment has shortened the lengths of the downstream transmission durations of all the transceivers of the central office equipment to the length of the new downstream transmission duration, the method further includes the following step:

The $(Mds\_New+1)^{th}$ to the $(Mds\_Old)^{th}$ symbols in the downstream transmission duration are processed by using a downstream precoding technology. For a signal for which a length of a downstream transmission duration has been shortened, an idle symbol (idle symbol) is transmitted in the $(Mds\_New+1)^{th}$ to the $(Mds\_Old)^{th}$ symbols in the downstream transmission duration. Mds_New is a quantity of symbols in the new downstream transmission duration; and Mds_Old is a quantity of symbols in the current downstream transmission duration.

Certainly, for the $1^{st}$ to the $(Mds\_New)^{th}$ symbols in the downstream transmission duration, processing needs to be performed by using the downstream precoding technology at any time.

Step S25: When the lengths of the downstream transmission durations of all the transceivers of the central office equipment have been shortened to the length of the new downstream transmission duration, the central office equipment sends third messages to the customer premise equipments, where the third message includes effective time TDD 3.

The TDD 3 is determined by the central office equipment based on implementation capability of the central office equipment and implementation capability of the customer premise equipment. For example, the central office equipment determines a time point at which the lengths of the downstream transmission durations of all the transceivers of the central office equipment have been shortened to the length of the new downstream transmission duration, determines, based on the second message sent by the customer premise equipment, a time point at which lengths of downstream transmission durations of transceivers of all the customer premise equipments have been shortened to the length of the new downstream transmission duration, and selects the time point TDD 3 after the two determined time points, that is, the TDD 3 is located after the TDD 2.

In this step, the TDD 3 is specifically a time point that is determined by the central office equipment and at which a length of an upstream transmission duration is adjusted to a length of a new upstream transmission duration. For different transceivers of the customer premise equipments, values of the TDD 3 may be different. In this embodiment of the present invention, the central office equipment respectively sends third messages to transceivers of corresponding customer premise equipments by using all the transceivers. The third message herein is the foregoing second instruction message.

In this step, the central office equipment sends the third messages by using downstream RMC symbol. The third message may use a DTAFDC to indicate the effective time TDD 3 determined by the central office equipment. The central office equipment may repeatedly send the DTA message in a TDD frame before the TDD 3 (including the TDD 3), and a DTAFDC decreases gradually (1 is subtracted from each transmission frame) until the TDD 3, and the DTAFDC changes to 0.

Further, before the central office equipment sends the third messages to the customer premise equipments, the central office equipment further needs to determine whether the downstream transmission durations of all the transceivers of the central office equipment have been shortened to the new downstream transmission duration.

The downstream transmission durations of all the transceivers of the central office equipment are adjusted by the central office equipment. Therefore, the central office equipment may record adjustment time of a downstream transmission duration of each transceiver. Whether the downstream transmission duration of each transceiver of the central office equipment has been shortened to the new downstream transmission duration is determined based on the recorded adjustment time of the downstream transmission duration of each transceiver.

Certainly, because all the transceivers of the central office equipment are controlled by the central office equipment, in an ideal state, it may be considered by default that all the transceivers shorten the lengths of the downstream transmission durations synchronously. In this way, the foregoing step of determining whether the downstream transmission durations of all the transceivers of the central office equipment have been shortened to the new downstream transmission duration is omitted.

Step S26: The central office equipment and the customer premise equipment adjust a length of an upstream transmission duration to the length of the new upstream transmission duration.

Specifically, the central office equipment and the customer premise equipment start to adjust a length of an upstream transmission duration of a transceiver to the length of the new upstream transmission duration from the TDD 3, and do not require that adjustment of lengths of upstream transmission durations of all transceivers be completed in the TDD 3.

After the central office equipment sends the third messages to the customer premise equipment, the method further includes: processing the $1^{st}$ to the (Mds_Old-Mds_New) symbols in the upstream transmission durations by using an upstream joint reception technology.

Certainly, for a subsequent symbol in the upstream transmission duration, processing needs to be performed by using the upstream joint reception technology at any time.

Figure 8:
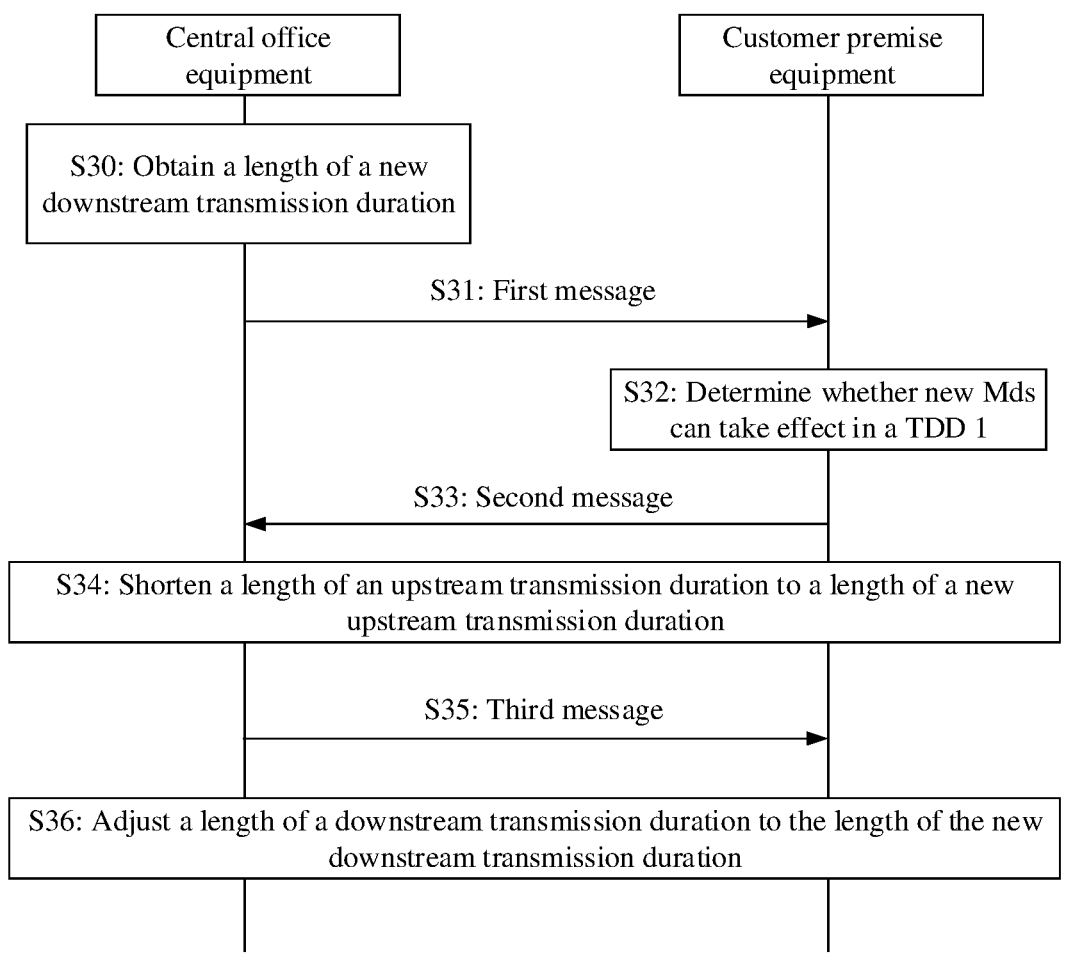
FIG. 8 is a flowchart of another dynamic time assignment method according to an embodiment of the present invention.

FIG. 8 is a flowchart of another dynamic time assignment method according to an embodiment of the present invention. A difference between the method shown in FIG. 8 and the method shown in FIG. 7 lies in that a length of a new downstream transmission duration is greater than a length of a current downstream transmission duration, and in the method, customer premise equipment sends a second message to central office equipment. Referring to FIG. 8, the method includes the following steps.

Step S30: The central office equipment obtains the length of the new downstream transmission duration.

For a specific procedure, refer to step S10.

Step S31: The central office equipment sends a first message to the customer premise equipment, where the first message includes Mds and effective time TDD 1, and the Mds includes the length of the new downstream transmission duration.

In this step, the TDD 1 is a time point that is determined by the central office equipment and at which a length of an upstream transmission duration is shortened to the length of the new upstream transmission duration.

Step S32: The customer premise equipment receives the first message, and determines whether a length of an upstream transmission duration can be shortened to the length of the new upstream transmission duration in the TDD 1.

Step S33: The customer premise equipment sends a second message to the central office equipment, where the second message is used to indicate effective time determined by the customer premise equipment.

Specifically, if a transceiver of the customer premise equipment can shorten the length of the upstream transmission duration to the length of the new upstream transmission duration in the TDD 1, the effective time of the transceiver of the customer premise equipment that is determined by the customer premise equipment and that is indicated by the second message is the TDD 1. If the transceiver of the customer premise equipment cannot shorten the length of the upstream transmission duration to the length of the new upstream transmission duration in the TDD 1, the effective time of the transceiver of the customer premise equipment that is determined by the customer premise equipment and that is indicated by the second message is a TDD 2. The TDD 2 is new effective time determined by the customer premise equipment. It should be noted that, for transceivers of different customer premise equipments, specific positions of the TDD 2 indicated in the second message may also be different. In this step, the TDD 2 is a time point that is determined by the customer premise equipment and at which a length of an upstream transmission duration of a transceiver is shortened to the length of the new upstream transmission duration.

Further, to simplify the second message, if the transceiver of the user equipment can shorten the length of the upstream transmission duration to the length of the new upstream transmission duration in the TDD 1, the second message may not include the TDD 1, but uses a simple acknowledgment (ACK) message to indicate that the transceiver of the customer premise equipment can shorten the length of the upstream transmission duration to the length of the new upstream transmission duration in the TDD 1.

Further, the method further includes: determining, by the central office equipment, whether lengths of upstream transmission durations of transceivers of all customer premise equipments have been shortened to the length of the new upstream transmission duration. A specific process may include:

receiving, by the central office equipment, second messages sent by the transceivers of all the customer premise equipments, where the second message is used to indicate a time point that is determined by customer premise equipment and at which a transceiver of the customer premise equipment shortens a length of an upstream transmission duration to the length of the new upstream transmission duration; determining, by the central office equipment based on the second messages, time points at which the transceivers of all the customer premise equipments shorten lengths of upstream transmission durations to the length of the new upstream transmission duration; and determining, by the central office equipment, based on the time points at which the transceivers of all the customer premise equipments shorten the lengths of the upstream transmission durations to the length of the new upstream transmission duration, whether the lengths of the upstream transmission durations of the transceivers of all the customer premise equipments have been shortened to the length of the new upstream transmission duration.

Specifically, the central office equipment compares a current time period (a transmission frame) with a latest time point in the time points at which the transceivers of all the customer premise equipments shorten the lengths of the upstream transmission durations to the latest time of the length of the new upstream transmission duration. If the latest time point is earlier than the current time point, it is determined that the lengths of the upstream transmission durations of the transceivers of all the customer premise equipments have been shortened to the length of the new upstream transmission duration. If the latest time point is not before the current time point, it is determined that a length of an upstream transmission duration of a transceiver of the customer premise equipment is not shortened to the length of the new upstream transmission duration.

Step S34: The central office equipment and the customer premise equipment shorten a length of an upstream transmission duration to the length of the new upstream transmission duration, where the sum of the length of the upstream transmission duration and the length of the downstream transmission duration is equal to a total length of one transmission frame minus upstream and downstream switching duration.

Before the lengths of the upstream transmission durations of the transceivers of all the customer premise equipments have been shortened to the length of the new upstream transmission duration, the method further includes the following step:

processing the $1^{st}$ to the $(Mds\_New-Mds\_Old)^{th}$ symbols in the upstream transmission durations by using an upstream joint reception technology, where Mds_New is a quantity of symbols in the new downstream transmission duration, and Mds_Old is a quantity of symbols in the current downstream transmission duration.

Certainly, for a subsequent symbol in the upstream transmission duration, processing needs to be performed by using the upstream joint reception technology at any time.

Step S35: After the lengths of the upstream transmission durations of the transceivers of all the customer premise equipments have been shortened to the length of the new upstream transmission duration, the central office equipment sends third messages to the customer premise equipments, where the third message includes effective time TDD 3.

The central office equipment determines, based on the second instruction message, that the transceivers of all the customer premise equipments shorten a length of an upstream transmission duration to the length of the new upstream transmission duration in the TDD 2. Because transceivers of a plurality of customer premise equipments are included herein, the TDD 2 is the latest TDD 2 in the second messages sent by the transceivers of the plurality of customer premise equipments. Therefore, the central office equipment may instruct, by using the third messages, the customer premise equipments to adjust the lengths of the downstream transmission durations in the TDD 3 that is after the TDD 2. In this step, the TDD 3 is a time point that is determined by the central office equipment and at which a length of a downstream transmission duration is adjusted to the length of the new downstream transmission duration.

Step S36: The central office equipment and the customer premise equipment adjust a length of a downstream transmission duration to the length of the new downstream transmission duration.

After the central office equipment sends the third message to the customer premise equipment, the method further includes: processing the $(Mds\_Old+1)^{th}$ to the $(Mds\_New)^{th}$ symbols in the downstream transmission durations by using a downstream precoding technology, where for a signal for which a length of a downstream transmission duration has been adjusted, an idle symbol is transmitted on the $(Mds\_Old+1)^{th}$ to the $(Mds\_New)^{th}$ symbols in the downstream transmission duration.

Certainly, for the $1^{st}$ to the $(Mds\_Old)^{th}$ symbols in the downstream transmission duration, processing needs to be performed by using the downstream precoding technology at any time.

Figure 9:
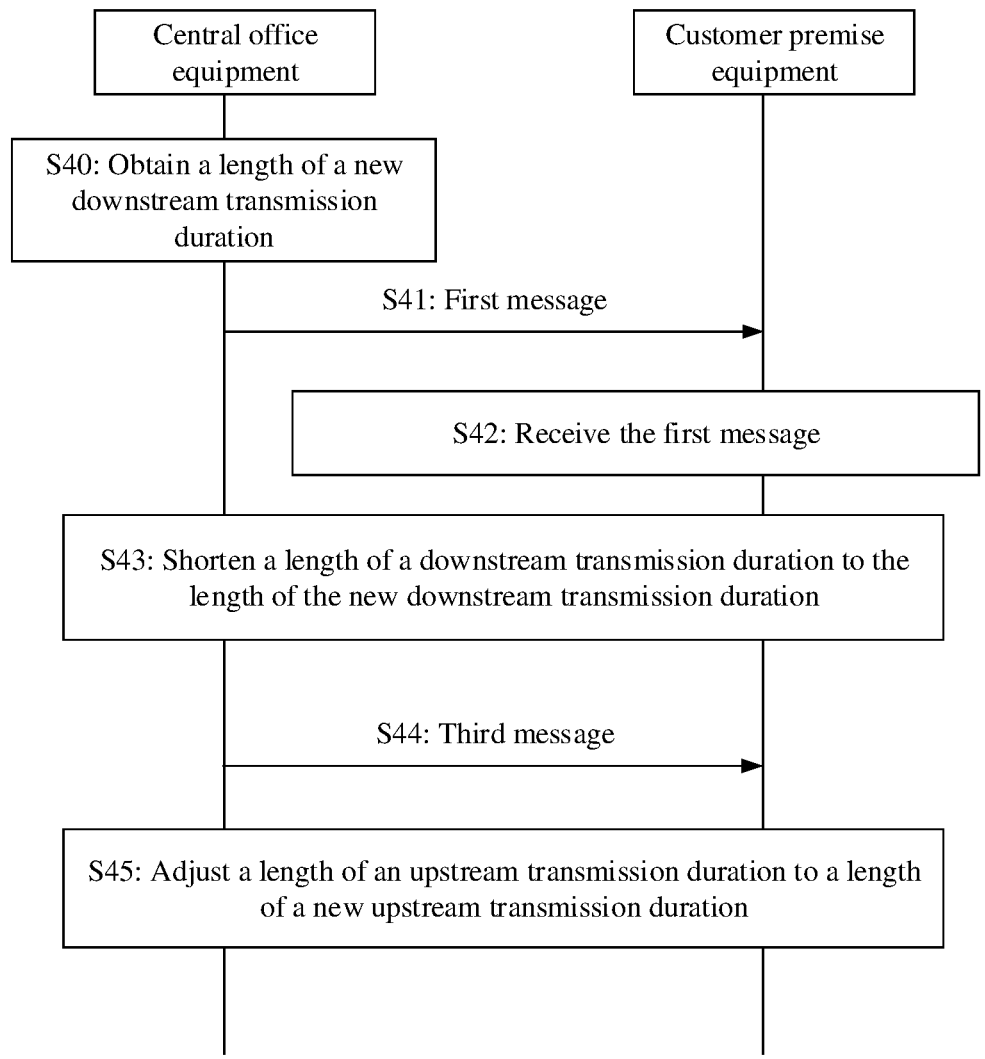
FIG. 9 is a flowchart of another dynamic time assignment method according to an embodiment of the present invention.

FIG. 9 is a flowchart of another dynamic time assignment method according to an embodiment of the present invention. In a method process provided in FIG. 9, a length of a new downstream transmission duration is less than a length of a current downstream transmission duration, and in the method, customer premise equipment does not send a second message to central office equipment. Referring to FIG. 9, the method includes the following steps.

Step S40: The central office equipment obtains the length of the new downstream transmission duration.

For a specific procedure, refer to step S10.

Step S41: The central office equipment sends a first message to the customer premise equipment, where the first message includes Mds and effective time TDD 1, and the Mds includes the length of the new downstream transmission duration.

In this step, the TDD 1 is specifically a time point that is determined by the central office equipment and at which the length of the downstream transmission duration is shortened to the length of the new downstream transmission duration.

Step S42: The customer premise equipment receives the first message.

Step S43: The central office equipment and the customer premise equipment shorten a length of a downstream transmission duration to the length of the new downstream transmission duration.

Before the central office equipment shortens lengths of downstream transmission durations of all transceivers of the central office equipment to the length of the new downstream transmission duration, the method further includes:

processing the $(Mds\_New+1)^{th}$ to the $(Mds\_Old)^{th}$ symbols in the downstream transmission durations by using a downstream precoding technology, where for a signal for which a length of a downstream transmission duration has been shortened, an idle symbol is transmitted in the $(Mds\_New+1)^{th}$ to the $(Mds\_Old)^{th}$ symbols in the downstream transmission duration, Mds_New is a quantity of symbols in the new downstream transmission duration, and Mds_Old is a quantity of symbols in the current downstream transmission duration.

Certainly, for the $1^{st}$ to the $(Mds\_New)^{th}$ symbols in the downstream transmission duration, processing needs to be performed by using the downstream precoding technology at any time.

In this embodiment of the present invention, for a process in which the central office equipment and the customer premise equipment shorten a length of a downstream transmission duration to the length of the new downstream transmission duration, refer to step S24.

Step S44: When the lengths of the downstream transmission durations of all the transceivers of the central office equipment have been shortened to the length of the new downstream transmission duration, the central office equipment sends third messages to the customer premise equipments, where the third message includes effective time TDD 3.

In this step, the TDD 3 is specifically a time point that is determined by the central office equipment and at which a length of an upstream transmission duration is adjusted to the length of the new upstream transmission duration.

Further, the method further includes: The central office equipment further needs to determine whether the downstream transmission durations of all the transceivers of the central office equipment have been shortened to the new downstream transmission duration.

The downstream transmission durations of all the transceivers of the central office equipment are adjusted by the central office equipment. Therefore, the central office equipment may record adjustment time of a downstream transmission duration of each transceiver; and determine, based on the recorded adjustment time of the downstream transmission duration of each transceiver, whether the downstream transmission durations of all the transceivers of the central office equipment have been shortened to the new downstream transmission duration.

Certainly, because all the transceivers of the central office equipment are controlled by the central office equipment, in an ideal state, it may be considered by default that all the transceivers shorten the lengths of the downstream transmission durations synchronously. In this way, the foregoing step of determining whether the downstream transmission durations of all the transceivers of the central office equipment have been shortened to the new downstream transmission duration is omitted.

Step S45: The central office equipment and the customer premise equipment adjust a length of an upstream transmission duration to the length of the new upstream transmission duration.

After the central office equipment sends the third messages to the customer premise equipments, the method further includes: processing the $1^{st}$ to the $(Mds\_Old-Mds\_New)^{th}$ symbols in the upstream transmission durations by using an upstream joint reception technology.

Certainly, for a subsequent symbol in the upstream transmission duration, processing needs to be performed by using the upstream joint reception technology at any time.

In this embodiment of the present invention, for a process in which the central office equipment and the customer premise equipment adjust a length of an upstream transmission duration to the length of the new upstream transmission duration, refer to step S26.

Figure 10:
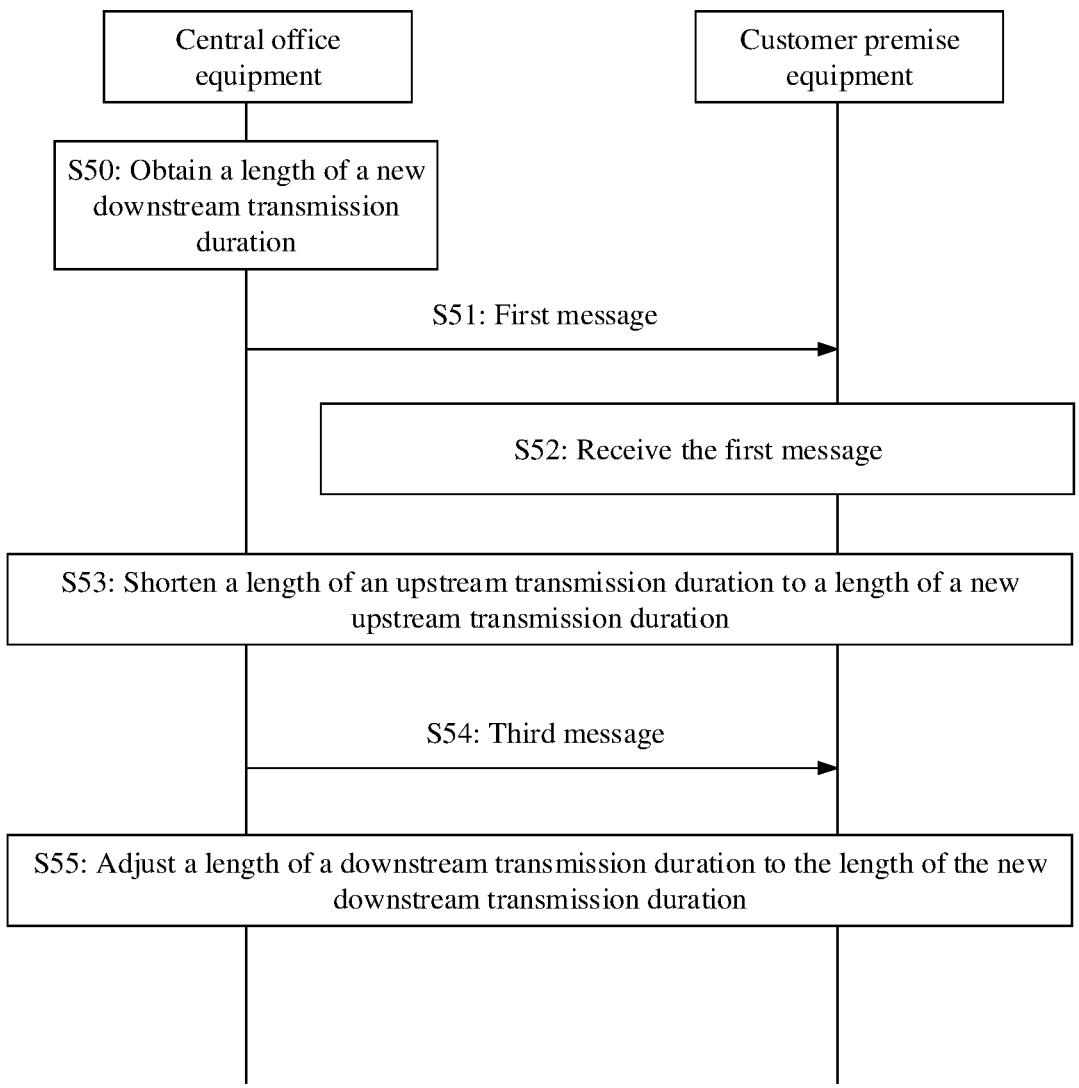
FIG. 10 is a flowchart of another dynamic time assignment method according to an embodiment of the present invention.

FIG. 10 is a flowchart of another dynamic time assignment method according to an embodiment of the present invention. A difference between the method shown in FIG.

10 and the method shown in FIG. 9 lies in that a length of a new downstream transmission duration is greater than a length of a current downstream transmission duration, and in the method, customer premise equipment does not send a second message to central office equipment. Referring to FIG. 10, the method includes the following steps.

Step S50: The central office equipment obtains a length of a new downstream transmission duration;

For a specific procedure, refer to step S10.

Step S51: The central office equipment sends a first message to the customer premise equipment, where the first message includes Mds and effective time TDD 1, and the Mds includes the length of the new downstream transmission duration.

In this step, the TDD 1 is specifically a time point that is determined by the central office equipment and at which a length of an upstream transmission duration is shortened to the length of the new upstream transmission duration.

Step S52: The customer premise equipment receives the first message.

Step S53: The central office equipment and the customer premise equipment shorten a length of an upstream transmission duration to the length of the new upstream transmission duration, where the sum of the length of the upstream transmission duration and the length of the downstream transmission duration is equal to a total length of one transmission frame minus upstream and downstream switching duration.

Before a length of an upstream transmission duration of a transceiver of the customer premise equipment is shortened to the length of the new upstream transmission duration, the method further includes:

processing the $1^{st}$ to the (Mds_New–Mds_Old)$^{th}$ symbols in the upstream transmission durations by using an upstream joint reception technology, where Mds_New is a quantity of symbols in the new downstream transmission duration, and Mds_Old is a quantity of symbols in the current downstream transmission duration.

Certainly, for a subsequent symbol in the upstream transmission duration, processing needs to be performed by using the upstream joint reception technology at any time.

Step S54: After the customer premise equipments have shortened all of the lengths of the upstream transmission durations of the transceivers of all the customer premise equipments to the length of the new upstream transmission duration, the central office equipment sends third messages to the customer premise equipments, where the third message includes effective time TDD 3.

In this step, the TDD 3 is specifically a time point that is determined by the central office equipment and at which the length of the downstream transmission duration is adjusted to the length of the new downstream transmission duration.

Further, the method further includes: determining, by the central office equipment, whether the lengths of the upstream transmission durations of the transceivers of all the customer premise equipments have been shortened to the length of the new upstream transmission duration. A specific process may include:

detecting, by the central office equipment frame by frame, a position of an upstream RMC symbol corresponding to a transceiver of customer premise equipment, where when it is detected that the position of the upstream RMC symbol corresponding to the transceiver of the customer premise equipment is delayed, relative to the first position, by a quantity of symbols to be increased by the new downstream transmission duration, it indicates that the length of the upstream transmission duration corresponding to the transceiver of the customer premise equipment has been shortened to the length of the new upstream transmission duration, the first position is the position of the upstream RMC symbol before a point time at which the length of the upstream transmission duration is shortened to the length of the new upstream transmission duration; and determining, by the central office equipment based on positions of upstream RMC symbols corresponding to transceivers of all customer premise equipments, whether the lengths of the upstream transmission durations of the transceivers of all the customer premise equipments have been shortened to the length of the new upstream transmission duration.

That the central office equipment detects, frame by frame, a position of an upstream RMC symbol corresponding to a transceiver of each customer premise equipment means that positions of upstream RMC symbols corresponding to all transceivers are detected simultaneously in each transmission frame.

Step S55: The central office equipment and the customer premise equipment adjust a length of a downstream transmission duration to the length of the new downstream transmission duration.

After the central office equipment sends the third message to the customer premise equipment, the method further includes: processing the (Mds_Old+1)$^{th}$ to the (Mds_New)$^{th}$ symbols in the downstream transmission durations by using a downstream precoding technology, where for a signal for which a length of a downstream transmission duration has been adjusted, an idle symbol is transmitted in the (Mds_Old+1)$^{th}$ to the (Mds_New)$^{th}$ symbols in the downstream transmission duration.

Certainly, for the $1^{st}$ to the (Mds_Old)$^{th}$ symbols in the downstream transmission duration, processing needs to be performed by using the downstream precoding technology at any time.

Figure 11:
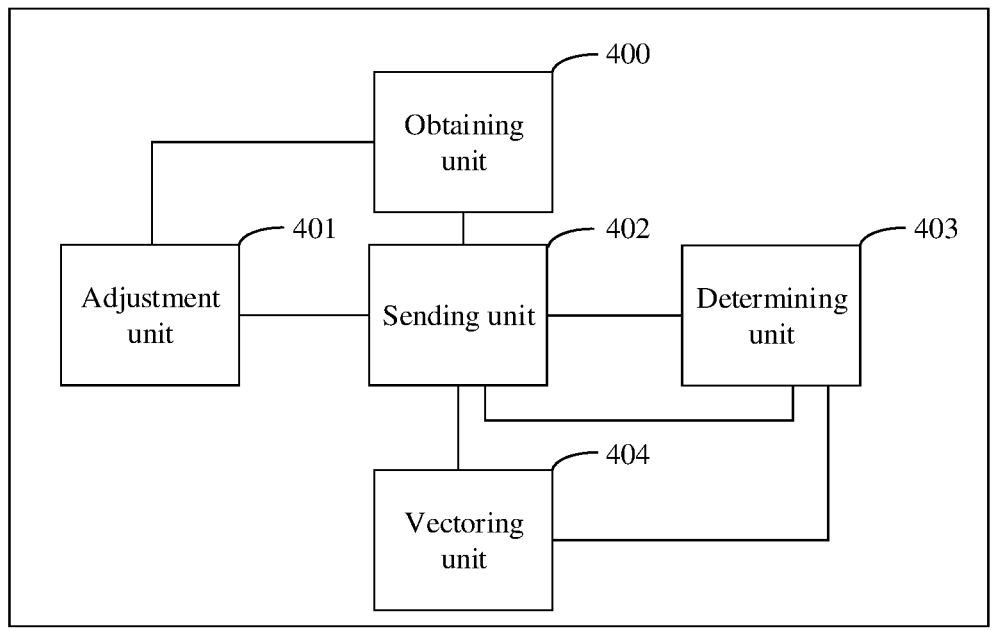
FIG. 11 is a schematic structural diagram of a dynamic time assignment apparatus according to an embodiment of the present invention.

An embodiment of the present invention provides a dynamic time assignment apparatus. The dynamic time assignment apparatus may be the foregoing central office equipment. FIG. 11 presents a schematic structure of a dynamic time assignment apparatus.

The data transmission apparatus may be implemented as an entire access network device or a part of an access network device by using a dedicated hardware circuit or a combination of software and hardware. The dynamic time assignment apparatus includes an obtaining unit 400 and an adjustment unit 401. The obtaining unit 400 is configured to obtain a length of a new downstream transmission duration. The adjustment unit 401 is configured to: when the length of the new downstream transmission duration is less than lengths of current downstream transmission durations of the at least two transceivers of the central office equipment, adjust lengths of current upstream transmission durations of the at least two transceivers to a length of a new upstream transmission duration after shortening the lengths of the current downstream transmission durations of the at least two transceivers to the length of the new downstream transmission duration; or when the length of the new downstream transmission duration is greater than lengths of current downstream transmission durations of the at least two transceivers, adjust the lengths of the current downstream transmission durations of the at least two transceivers to the length of the new downstream transmission duration after shortening lengths of current upstream transmission durations of the at least two transceivers to a length of a new upstream transmission duration. A sum of the length of the new upstream transmission duration and the length of the new downstream transmission duration is equal to a length obtained by subtracting upstream and downstream switching duration from one transmission frame.

Optionally, the dynamic time assignment apparatus further includes a sending unit 402 that sends a first instruction message and a second instruction message.

Optionally, the dynamic time assignment apparatus further includes a determining unit 403 configured to: determine whether lengths of downstream transmission durations of all transceivers of the central office equipment have been shortened to the length of the new downstream transmission duration, or determine whether lengths of upstream transmission durations of transceivers of all customer premise equipments have been shortened to the length of the new upstream transmission duration.

Optionally, the dynamic time assignment apparatus further includes a vectoring unit 404 configured to perform vectoring.

For related details, refer to the method embodiments corresponding to FIG. 6 to FIG. 10.

It should be noted that the adjustment unit 401, the determining unit 403, and the vectoring unit 404 may be implemented by a processor, or implemented by a processor by executing a program instruction in a memory. The obtaining unit 400 and the sending unit 402 may be implemented by a communications interface, or implemented by a communications interface in combination with a processor.

Figure 12:
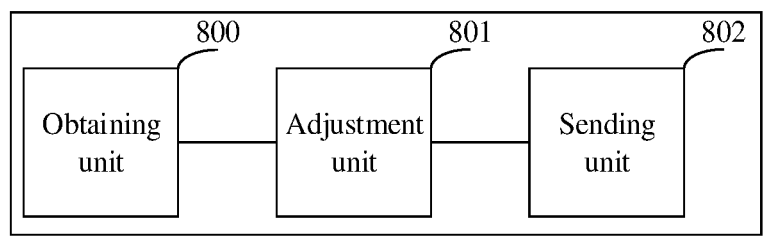
FIG. 12 is a schematic structural diagram of another dynamic time assignment apparatus according to an embodiment of the present invention.

An embodiment of the present invention provides a dynamic time assignment apparatus. The dynamic time assignment apparatus may be the foregoing customer premise equipment. FIG. 12 presents a schematic structural diagram of a dynamic time assignment apparatus.

The dynamic time assignment apparatus may be implemented as an entire access network device or a part of an access network device by using a dedicated hardware circuit or a combination of software and hardware. The dynamic time assignment apparatus includes an obtaining unit 800 and an adjustment unit 801. The obtaining unit 800 is configured to obtain a length of a new downstream transmission duration. The adjustment unit 801 is configured to: when the length of the new downstream transmission duration is less than a length of a current downstream transmission duration of a transceiver of the customer premise equipment, adjust a length of a current upstream transmission duration of the transceiver of the customer premise equipment to a length of a new upstream transmission duration after shortening the length of the current downstream transmission duration of the transceiver of the customer premise equipment to the length of the new downstream transmission duration; or when the length of the new downstream transmission duration is greater than a length of a current downstream transmission duration of a transceiver of the customer premise equipment, adjust the length of the current downstream transmission duration of the transceiver of the customer premise equipment to the length of the new downstream transmission duration after shortening a length of a current upstream transmission duration of the transceiver of the customer premise equipment to the length of the new upstream transmission duration. A sum of the length of the new upstream transmission duration and the length of the new downstream transmission duration is equal to a length obtained by subtracting upstream and downstream switching duration from one transmission frame.

Optionally, the dynamic time assignment apparatus further includes a sending unit 802 configured to send a third instruction message to the central office equipment.

For related details, refer to the method embodiments corresponding to FIG. 6 to FIG. 10.

It should be noted that, the adjustment unit 801 may be implemented by a processor, or implemented by a processor by executing a program instruction in a memory. The obtaining unit 800 and the sending unit 802 may be implemented by a communications interface, or implemented by a communications interface in combination with a processor.

Figure 13:
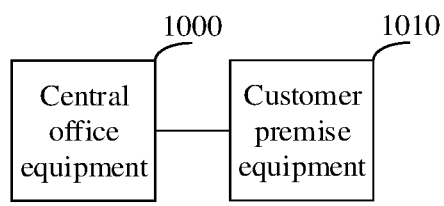
FIG. 13 is a schematic structural diagram of a dynamic time assignment system according to an embodiment of the present invention.

An embodiment of the present invention provides a dynamic time assignment system. Referring to FIG. 13, the dynamic time assignment system may include the foregoing central office equipment 1000 and the foregoing customer premise equipment 1010. The central office equipment 1000 includes the dynamic time assignment apparatus shown in FIG. 11, and the customer premise equipment 1010 includes the dynamic time assignment apparatus shown in FIG. 12.

All of examples in the foregoing plurality of embodiments are used to adjust a length or lengths of an upstream transmission duration or a downstream transmission duration based on an Mds parameter. In an optional embodiment, a length of a transmission duration in one direction (to be specific, one, whose length needs to be shortened, of a downstream transmission duration and an upstream transmission duration) may first be shortened by adjusting a transmission opportunity (Transmission Opportunity, TXOP) parameter (or an RMC symbol position and a TXOP parameter), and after lengths of transmission durations of all ports in the direction are all shortened (that is, after lengths of all downstream transmission durations or lengths of all upstream transmission durations are shortened), a length of a transmission duration in another direction is prolonged (one, whose length needs to be prolonged is prolonged, of a downstream transmission duration and an upstream transmission duration).

The TXOP parameter includes a regular operating duration length TTR, an interval symbol quantity TA, and a transmit budget Tbudget, and is a parameter that has been specified in the current G.9701 standard. When a position of the RMC symbol and the Mds have been specified (if the two parameters are specified, positions of all symbols of a TDD frame are specified), the TXOP parameter may be adjusted through an RMC channel, and the change of the TXOP parameter may be used to adjust a position of a symbol that can be used to transmit data in the TDD frame. A total of TBudget symbols, to be specific, the $1^{st}$ to the $(TR)^{th}$ symbols and the $(TTR+TA+1)^{th}$ to the $(TBudget+TA)^{th}$ symbols, in one TDD frame may be used to transmit data.

For example, when Mds_new<Mds_old, the TXOP parameter is adjusted in the downstream direction to ensure that a downstream transmission timeslot is in Mds_new symbols starting from a downstream transmission timeslot of the TDD frame. For example, the foregoing objectives are achieved by making the following hold true: TTR<Mds_new-DS RMC offset and TA+TTR>Mds_old-DS RMC offset.

It should be noted that the dynamic time assignment apparatuses provided in the foregoing embodiments use only division of the foregoing function modules as an example for description during dynamic time assignment. In actual application, the foregoing functions can be allocated to different function modules for implementation as required. To be specific, an inner structure of the device is divided into different function modules to implement all or some of the foregoing functions. In addition, the dynamic time assignment apparatuses provided in the foregoing embodiments are based on a same conception as the foregoing dynamic time assignment method embodiments, and for a specific implementation process, refer to the method embodiments, and details are not described again.

A person of ordinary skill in the art may understand that all or some of the steps of the foregoing embodiments may be implemented by hardware or a program instructing related hardware. The program may be stored in a computer readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made without departing from the spirit and principle of this application shall fall within the protection scope of this application.

What is claimed is:

1. A method, comprising:
obtaining, by central office equipment, a length of a new downstream transmission duration, wherein the central office equipment comprises a plurality of transceivers; and
performing the following:
in response to the length of the new downstream transmission duration being less than lengths of current downstream transmission durations of the plurality of transceivers of the central office equipment, adjusting, by the central office equipment, lengths of current upstream transmission durations of the plurality of transceivers to a length of a new upstream transmission duration after shortening the lengths of the current downstream transmission durations of the plurality of transceivers to be the length of the new downstream transmission duration; or
in response to the length of the new downstream transmission duration being greater than the lengths of current downstream transmission durations of the plurality of transceivers, adjusting, by the central office equipment, the lengths of the current downstream transmission durations of the plurality of transceivers to the length of the new downstream transmission duration after shortening the lengths of current upstream transmission durations of the plurality of transceivers to a length of a new upstream transmission duration; and
wherein a sum of the length of the new upstream transmission duration and the length of the new downstream transmission duration is equal to a length obtained by subtracting an upstream switching duration and a downstream switching duration from one transmission frame.

2. The method according to claim 1, further comprising:
after the central office equipment obtains the length of the new downstream transmission duration, sending, by the central office equipment, a plurality of first instruction messages to a plurality of customer premise equipment, wherein each first instruction message of the plurality of first instruction messages comprises the length of the new downstream transmission duration; and
after the lengths of the current downstream transmission durations of the plurality of transceivers of the central office equipment have been shortened to the length of the new downstream transmission duration, or after lengths of upstream transmission durations of transceivers of the plurality of customer premise equipment have been shortened to the length of the new upstream transmission duration, sending, by the central office equipment, a plurality of second instruction messages to the plurality of customer premise equipment, wherein each second instruction message of the plurality of second instruction messages instructs a receiving customer premise equipment of the plurality of customer premise equipment to adjust a length parameter of an upstream transmission duration or a length parameter of a downstream transmission duration of a transceiver of the receiving customer premise equipment to a length of an upstream transmission duration or a length of a downstream transmission duration that are determined based on the length of the downstream transmission duration in the plurality of first instruction messages, and transceivers of the plurality of customer premise equipment and the plurality of transceivers of the central office equipment are disposed in a corresponding manner.

3. The method according to claim 2, wherein:
sending, by the central office equipment, the plurality of first instruction messages to the plurality of customer premise equipment comprises:
sending, by the central office equipment, the plurality of first instruction messages using downstream robustness management channel (RMC) symbols; and
sending, by the central office equipment, the plurality of second instruction messages to the plurality of customer premise equipment comprises:
sending, by the central office equipment, the plurality of second instruction messages using RMC symbols.

4. The method according to claim 1, further comprising:
determining, by the central office equipment, whether lengths of upstream transmission durations of transceivers of a plurality of customer premise equipment have been shortened to the length of the new upstream transmission duration.

5. The method according to claim 4, wherein determining, by the central office equipment, whether the lengths of the upstream transmission durations of the transceivers of the plurality of customer premise equipment have been shortened to the length of the new upstream transmission duration comprises:
receiving, by the central office equipment, a plurality of third instruction messages sent by the transceivers of the plurality of customer premise equipment, wherein each third instruction message of the plurality of third instruction messages indicates a respective time point that is determined by a sending customer premise equipment and at which a sending transceiver of the sending customer premise equipment shortens a lengths of the upstream transmission duration to the length of the new upstream transmission duration;
determining, by the central office equipment based on the plurality of third instruction messages, a time point at which the transceivers of the plurality of customer premise equipment shorten the lengths of the upstream transmission durations to the length of the new upstream transmission duration; and
determining, by the central office equipment based on the time point at which the transceivers of the plurality of customer premise equipment shorten the lengths of the upstream transmission durations to the length of the new upstream transmission duration, whether the lengths of the upstream transmission durations of the transceivers of the plurality of customer premise equipment have been shortened to the length of the new upstream transmission duration.

6. The method according to claim 4, wherein determining, by the central office equipment, whether the lengths of the upstream transmission durations of the transceivers of the plurality of customer premise equipment have been shortened to the length of the new upstream transmission duration comprises:

detecting, by the central office equipment on a frame by frame basis, positions of upstream robustness management channel (RMC) symbols corresponding to the transceivers of the plurality of customer premise equipment, wherein when it is detected that a position of a first upstream RMC symbol corresponding to a transceiver of a first customer premise equipment is delayed, relative to a first position, by a quantity of symbols by which the new downstream transmission duration is to be increased, a length of an upstream transmission duration corresponding to the transceiver of the first customer premise equipment has been shortened to the length of the new upstream transmission duration, wherein the first position is the position of the first upstream RMC symbol before a time point at which the length of the upstream transmission duration is shortened to the length of the new upstream transmission duration, and the plurality of customer premise equipment comprise the first customer premises equipment; and determining, by the central office equipment based on the detected positions of the upstream RMC symbols corresponding to the transceivers of the plurality of customer premise equipment, whether the lengths of the upstream transmission durations of the transceivers of the plurality of customer premise equipment have been shortened to the length of the new upstream transmission duration.

7. The method according to claim 1, wherein the length of the new downstream transmission duration is less than the lengths of the current downstream transmission durations of the plurality of transceivers of the central office equipment, and the method further comprises:

before the lengths of the downstream transmission durations of the plurality of transceivers of the central office equipment have been shortened to the length of the new downstream transmission duration, processing, by the central office equipment, $(Mds\_New+1)^{th}$ to the $(Mds\_Old)^{th}$ symbols in the downstream transmission durations using a downstream precoding technology, wherein the $(Mds\_New+1)^{th}$ to the $(Mds\_Old)^{th}$ symbols in the downstream transmission durations are idle symbols, Mds_New is a quantity of symbols in the new downstream transmission duration, and Mds_Old is a quantity of symbols in the current downstream transmission duration.

8. The method according to claim 1, wherein the length of the new downstream transmission duration is greater than the lengths of the current downstream transmission durations of the plurality of transceivers of the central office equipment, and the method further comprises:

before the lengths of the upstream transmission durations of transceivers of a plurality of customer premise equipment have been shortened to the length of the new upstream transmission duration, processing, by the central office equipment, a $1^{st}$ to a $(Mds\_New-Mds\_Old)^{th}$ symbols in the upstream transmission durations using an upstream joint reception technology, wherein Mds_New is a quantity of symbols in the new downstream transmission duration, and Mds_Old is a quantity of symbols in the current downstream transmission duration.

9. A method, comprising:

obtaining, by customer premise equipment, a length of a new downstream transmission duration; and performing the following:

in response to the length of the new downstream transmission duration being less than a length of a current downstream transmission duration of a transceiver of the customer premise equipment, adjusting, by the customer premise equipment, a length of a current upstream transmission duration of the transceiver of the customer premise equipment to a length of a new upstream transmission duration after shortening the length of the current downstream transmission duration of the transceiver of the customer premise equipment to the length of the new downstream transmission duration; or in response to the length of the new downstream transmission duration being greater than a length of a current downstream transmission duration of the transceiver of the customer premise equipment, adjusting, by the customer premise equipment, the length of the current downstream transmission duration of the transceiver of the customer premise equipment to the length of the new downstream transmission duration after shortening the length of the current upstream transmission duration of the transceiver of the customer premise equipment to a length of a new upstream transmission duration; and wherein a sum of the length of the new upstream transmission duration and the length of the new downstream transmission duration is equal to a length obtained by subtracting an upstream switching duration and a downstream switching duration from one transmission frame.

10. The method according to claim 9, wherein obtaining, by the customer premise equipment, the length of the new downstream transmission duration comprises:

receiving, by the customer premise equipment, a first instruction message sent by central office equipment, wherein the first instruction message comprises the length of the new downstream transmission duration.

11. The method according to claim 10, further comprising:

receiving, by the customer premise equipment, a second instruction message sent by the central office equipment, wherein the second instruction message instructs the customer premise equipment to adjust a length parameter of an upstream transmission duration or a length parameter of a downstream transmission duration of the transceiver of the customer premise equipment to a length of an upstream transmission duration or a length of a downstream transmission duration that are determined based on the length of the downstream transmission duration in the first instruction message, and the transceivers of the customer premise equipment and a transceiver of the central office equipment are correspondingly disposed.

12. The method according to claim 9, further comprising:

sending, by the customer premise equipment, a third instruction message to central office equipment, wherein the third instruction message indicates a time point that is determined by the customer premise equipment and at which the transceiver of the customer premise equipment shortens a length of an upstream transmission duration to the length of the new upstream transmission duration.

13. An apparatus, comprising:
a processor;
a communications interface comprising a plurality of transceivers; and
a non-transitory memory, wherein the non-transitory memory stores storing a plurality of processor-executable instructions that, when executed by the processor, cause the processor and the communications interface to:
obtain a length of a new downstream transmission duration; and
perform the following:
- in response to the length of the new downstream transmission duration being less than lengths of current downstream transmission durations of the plurality of transceivers of the communications interface, adjusting lengths of current upstream transmission durations of the plurality of transceivers of the communication interface to a length of a new upstream transmission duration after shortening the lengths of the current downstream transmission durations of the plurality of transceivers of the communication interface to the length of the new downstream transmission duration; or
- when the length of the new downstream transmission duration is greater than the lengths of current downstream transmission durations of the plurality of transceivers of the communication interface, adjusting the lengths of the current downstream transmission durations of the plurality of transceivers of the communication interface to the length of the new downstream transmission duration after shortening the lengths of current upstream transmission durations of the plurality of transceivers of the communication interface to a length of a new upstream transmission duration; and
- wherein a sum of the length of the new upstream transmission duration and the length of the new downstream transmission duration is equal to a length obtained by subtracting an upstream switching duration and an downstream switching duration from one transmission frame.

14. The apparatus according to claim 13, wherein the instructions, when executed by the processor, further cause the processor and the communication interface to:
after obtaining the length of the new downstream transmission duration, sending a plurality of first instruction messages to a plurality of customer premise equipment, wherein each first instruction message of the plurality of first instruction messages comprises the length of the new downstream transmission duration; and
after the lengths of the downstream transmission durations of the plurality of transceivers of the communication interface have been shortened to the length of the new downstream transmission duration, or after lengths of upstream transmission durations of transceivers of the plurality of customer premise equipment have been shortened to the length of the new upstream transmission duration, sending a plurality of second instruction messages to the plurality of customer premise equipment, wherein each second instruction message of the plurality of second instruction messages instruct a receiving customer premise equipment to adjust a length parameter of an upstream transmission duration or a length parameter of a downstream transmission duration of a transceiver of the receiving customer premise equipment to a length of an upstream transmission duration or a length of a downstream transmission duration that are determined based on the length of the downstream transmission duration, and the transceivers of the plurality of customer premise equipment and the plurality of transceivers of the communication interface are correspondingly disposed.

15. The apparatus according to claim 14, wherein sending the plurality of first instruction messages and sending the plurality of second instruction messages comprise:
sending the plurality of first instruction messages using downstream robustness management channel (RMC) symbols; and
sending the plurality of second instruction messages using RMC symbols.

16. The apparatus according to claim 14, wherein the instructions, when executed by the processor, further cause the processor and the communication interface to:
determine whether lengths of upstream transmission durations of the transceivers of the plurality of customer premise equipment have been shortened to the length of the new upstream transmission duration.

17. An apparatus, comprising:
a processor;
a communications interface comprising a transceiver; and
a non-transitory memory, wherein the non-transitory memory stores storing a plurality of processor-executable instructions that, when executed by the processor, cause the processor and the communications interface to perform operations comprising:
obtaining a length of a new downstream transmission duration; and
performing the following:
- in response to the length of the new downstream transmission duration being less than a length of a current downstream transmission duration of the transceiver, adjusting a length of a current upstream transmission duration of the transceiver to a length of a new upstream transmission duration after shortening the length of the current downstream transmission duration of the transceiver to the length of the new downstream transmission duration; or
- in response to the length of the new downstream transmission duration being greater than the length of the current downstream transmission duration of the transceiver, adjusting the length of the current downstream transmission duration of the transceiver to the length of the new downstream transmission duration after shortening a length of a current upstream transmission duration of the transceiver to a length of a new upstream transmission duration; and
- wherein a sum of the length of the new upstream transmission duration and the length of the new downstream transmission duration is equal to a length obtained by subtracting an upstream switching duration and an downstream switching duration from one transmission frame.

18. The apparatus according to claim 17, wherein the instructions, when executed by the processor, further cause the processor and the communication interface to:
receive a plurality of first instruction messages sent by central office equipment, wherein each first instruction message of the plurality of first instruction messages comprises the length of the new downstream transmission duration.

19. The apparatus according to claim 18, wherein the instructions, when executed by the processor, further cause the processor and the communication interface to:

receive a second instruction message sent by the central office equipment, wherein the second instruction message instructs to adjust a length parameter of an upstream transmission duration or a length parameter of a downstream transmission duration of the transceiver to a length of an upstream transmission duration or a length of a downstream transmission duration that are determined based on the length of the downstream transmission duration in the first instruction message, and the transceiver and the a transceiver of the central office equipment are disposed correspondingly.

20. The apparatus according to claim 17, wherein the operations further comprise:

sending a third instruction message to central office equipment, wherein the third instruction message is used to indicate a time point that is determined by the apparatus and at which the transceiver shortens a length of an upstream transmission duration to the length of the new upstream transmission duration.

* * * * *